United States Patent
Gao et al.

(10) Patent No.: US 11,048,642 B2
(45) Date of Patent: Jun. 29, 2021

(54) KEY-VALUE STORAGE METHOD, APPARATUS, AND SYSTEM

(71) Applicant: HUAWEI TECHNOLOGIES CO., LTD., Guangdong (CN)

(72) Inventors: Feng Gao, Hangzhou (CN); Huiqin Yuan, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 40 days.

(21) Appl. No.: 16/287,826

(22) Filed: Feb. 27, 2019

(65) Prior Publication Data

US 2019/0196976 A1    Jun. 27, 2019

Related U.S. Application Data

(63) Continuation of application No. PCT/CN2017/085983, filed on May 25, 2017.

(30) Foreign Application Priority Data

Aug. 31, 2016   (CN) .......................... 201610794448.4

(51) Int. Cl.
*G06F 12/10*     (2016.01)
*G06F 3/06*      (2006.01)
*G06F 16/22*     (2019.01)

(52) U.S. Cl.
CPC ............ *G06F 12/10* (2013.01); *G06F 3/0604* (2013.01); *G06F 3/0659* (2013.01);
(Continued)

(58) Field of Classification Search
CPC .................. G06F 12/10; G06F 16/2255; G06F 2212/657; G06F 3/0604; G06F 3/0659; G06F 3/0673
See application file for complete search history.

(56) References Cited

U.S. PATENT DOCUMENTS

2009/0049222 A1   2/2009 Lee et al.
2014/0289463 A1   9/2014 Carl
(Continued)

FOREIGN PATENT DOCUMENTS

CN    102929793 A    2/2013
CN    103955440 A    7/2014
(Continued)

OTHER PUBLICATIONS

Biplob Debnath et al. FlashStore: High Throughput Persistent KeyValue Store, Proceedings of the VLDB Endowment, vol. 3, No. 2, 2010, pp. 1414-1425, XP58141887A.
(Continued)

*Primary Examiner* — Yong J Choe
(74) *Attorney, Agent, or Firm* — Womble Bond Dickinson (US) LLP

(57) ABSTRACT

Embodiments of this application provide a key-value storage method, apparatus, and system, to resolve at least a problem that currently no related solution can combine key-value storage with such efficient storage protocol as an NVMe protocol. The method includes: writing, by a host after detecting a key-value storage request, a first instruction code and address information that are carried in the key-value storage request to a field defined in a protocol, to constitute a first storage request instruction sequence, where the first instruction code is an instruction code defined based on a reserved extension field in the protocol; and interacting, by the host, with the storage controller, so that the storage controller obtains the first storage request instruction sequence. This application is applicable to the field of storage technologies.

21 Claims, 22 Drawing Sheets

(52) U.S. Cl.
CPC ........ *G06F 3/0673* (2013.01); *G06F 16/2255* (2019.01); *G06F 2212/657* (2013.01)

(56) References Cited

U.S. PATENT DOCUMENTS

| | | |
|---|---|---|
| 2015/0254003 A1 | 9/2015 | Lee et al. |
| 2018/0210970 A1 | 7/2018 | Marukame et al. |

FOREIGN PATENT DOCUMENTS

| | | |
|---|---|---|
| CN | 104111907 A | 10/2014 |
| CN | 105051675 A | 11/2015 |
| CN | 106469198 A | 3/2017 |
| EP | 3147792 A1 | 3/2017 |

OTHER PUBLICATIONS

Brent Welch et al. Object-Based Cluster Storage Systems, Retrieved from the internet: http://storageconference.us/2006/Presentations/panasas.dnagle.pdf, May 2006. total 104 pages. XP55596104A.

Hyeong-Jun Kim et al. NVMeDirect: A User-space I/O Framework for Application-specific Optimization on NVMe SSDs, 2016. total 5 pages. XP55594838A.

LiangMing:"Converged_Storage_Technology", SNIA Global Education, Retrieved from the internet:https://www.snia.org/sites/default/files/tutorials/FAST2016/FAST2016-LiangMing_Converged_Storage_Technology-Final.pdf, 2016. total 26 pages. XP55594844A.

CONT. FROM FIG. 7A

CONT. FROM FIG. 7A

CONT. FROM FIG. 7A

S707. The key-value storage processing unit processes the information about the address at which the key is stored, converts the read operation request into a read operation request corresponding to a storage device, and submits the read operation request to a storage control unit S708. The storage control unit obtains the length corresponding to the value from the storage device S709. The storage control unit submits information about the length of the value to the key-value storage processing unit S710. The key-value storage processing unit and the foregoing units sequentially transfer the information about the length of the value to the middleware S711. The middleware allocates memory to the value in a host S713. The NVMe command conversion unit of the NVMe driver layer writes, to the NVMe sending queue, an instruction 82h on obtaining the value, and the information about the address at which the key is stored Sending queue command format 2

| Byte | Description |
|---|---|
| 63:40 | Command dwords 10 to 15 |
| 39:24 | Data pointer: the information about the address at which the key is stored |
| 23:04 | Command dwords 1 to 6 |
| 03:00 | Instruction code: 82h |

KEY-VALUE STORAGE METHOD, APPARATUS, AND SYSTEM

CROSS-REFERENCE TO RELATED APPLICATIONS

This application is a continuation of International Application No. PCT/CN2017/085983, filed on May 25, 2017, which claims priority to Chinese Patent Application No. 201610794448.4, filed on Aug. 31, 2016, The disclosures of the aforementioned applications are hereby incorporated by reference in their entireties.

TECHNICAL FIELD

This application relates to the field of storage technologies, and in particular, to a key-value storage method, apparatus, and system.

BACKGROUND

Key-value (KV) storage is a not only structured query language (NoSQL) storage manner. In the key-value storage, data is organized, indexed, and stored in a form of key-value pairs. Therefore, such storage has features of simple storage semantics, good storage system scalability, a fast data query speed, and a large data storage capacity.

A non-volatile memory express (NVMe) protocol is an efficient storage protocol among a plurality of storage protocols of a current storage system. Compared with a storage system using a conventional small computer system interface (SCSI) protocol, a storage system using the NVMe protocol has features of a short I/O path, a low delay, and a strong concurrent processing capability because a general input/output (I/O) scheduling layer, a SCSI upper layer, and a SCSI middle layer are omitted.

If key-value storage is combined with such type of efficient storage protocol as the NVMe protocol, a storage system may have advantages of both. However, currently no related solution can combine the key-value storage with such type of efficient storage protocol as the NVMe protocol.

SUMMARY

Embodiments of this application provide a key-value storage method, apparatus, and system, to resolve a prior-art problem that key-value storage cannot be combined with some efficient storage protocols (such as an NVMe protocol).

To resolve the foregoing problem, the embodiments of this application provide the following technical solutions.

According to an aspect, an embodiment of this application provides a key-value storage method. The method includes: writing, by a host after detecting a key-value storage request, a first instruction code and address information that are carried in the key-value storage request to a field defined in a protocol, to constitute a first storage request instruction sequence, where the first instruction code is an instruction code defined based on a reserved extension field in the protocol; and further, interacting, by the host, with the storage controller, so that the storage controller obtains the first storage request instruction sequence.

In the key-value storage method provided in this embodiment of this application, a key-value storage operation is extended to a storage protocol. Therefore, the host can implement the key-value storage through interaction between the storage protocol and the storage controller, without a need to perform conversion on a block layer or a file system to implement the key-value storage, thereby further reducing an I/O path delay of a storage system.

In a possible design, the writing, by the host, a first instruction code and address information that are carried in the key-value storage request to a field defined in a protocol, to constitute a first storage request instruction sequence includes: allocating, by the host, memory to the first storage request instruction sequence based on the field defined in the protocol; and writing, by the host, the first instruction code and the address information that are carried in the key-value storage request to the memory; and further, the interacting, by the host, with the storage controller (for example, sending a notification message), so that the storage controller obtains the first storage request instruction sequence includes: instructing, by the host, the storage controller to read the first storage request instruction sequence from the memory. In addition to enabling the storage controller to obtain the first storage request instruction sequence, the host may also directly send the first storage request instruction sequence to the storage controller.

The manner in which the host instructs the storage controller to read the first storage request instruction sequence from the memory can save memory space of the storage controller.

In a possible design, the key-value storage request includes a data write request, a data obtaining request, a data deletion request, or a data discarding request, where address information carried in the data write request includes information about addresses at which a key and a value are stored; address information carried in the data obtaining request includes information about an address at which a key is stored; address information carried in the data deletion request includes information about an address at which a key is stored; and address information carried in the data discarding request includes information about an address at which a key is stored.

Certainly, the foregoing descriptions are merely examples of some key-value storage request operations, and there may be other key-value storage request operations. This is not limited in this embodiment of this application.

In some possible designs, if the key-value storage request is a data obtaining request, before the writing, by a host after detecting a key-value storage request, a first instruction code and address information that are carried in the key-value storage request to a field defined in a protocol, to constitute a first storage request instruction sequence, the method further includes: obtaining, by the host, a length that is of a value and that is requested by the data obtaining request; and allocating, by the host, memory to the value based on the length of the value, so that after the host interacts with the storage controller and the storage controller obtains the first storage request instruction sequence, the storage controller reads data to the memory allocated by the host to the value.

In other words, if the key-value storage request is a data obtaining request, the host first needs to allocate the memory to the value. In this way, the data read by the storage controller from the storage device has corresponding storage space.

In a possible design, the obtaining, by the host, a length that is of a value and that is requested by the data obtaining request includes: writing, by the host to the field defined in the protocol, an instruction code of obtaining a length of a value corresponding to a key, and information about an address at which the key is stored, to constitute a second storage request instruction sequence, where the instruction code of obtaining the length of the value corresponding to the key is an instruction code defined based on the reserved extension field in the protocol; interacting, by the host, with the storage controller, so that the storage controller obtains the second storage request instruction sequence; and receiving, by the host, the length that is of the value and that is sent by the storage controller.

In the foregoing manner, the host can obtain the length that is of the value and that is requested by the data obtaining request.

In a possible design, the key-value storage request is an aggregated key-value storage request including a plurality of single key-value storage requests, where the address information carried in the key-value storage request is indexed by using address information in a scatter gather list, and the scatter gather list includes address information carried in each of the plurality of single key-value storage requests.

The plurality of single key-value storage requests are combined into the aggregated key-value storage request, and the address information carried in each of the plurality of single key-value storage requests is indexed by using the scatter gather list, so that a plurality of single key-value storage operations can be completed at the same time in one key-value storage operation procedure, thereby improving efficiency of key-value storage.

In a possible design, the method further includes: writing, by the host after detecting a non-key-value storage request, a second instruction code and a data memory pointer that are carried in the non-key-value storage request to the field defined in the protocol, to constitute a third storage request instruction sequence, where the second instruction code is a standard instruction code of the protocol; and interacting, by the host, with the storage controller, so that the storage controller obtains the third storage request instruction sequence.

In the key-value storage method provided in this embodiment of this application, the host can implement non-key-value storage through the interaction between the storage protocol and the storage controller. Therefore, conventional block device storage can be supported while the key-value storage is supported.

According to another aspect, an embodiment of this application provides a key-value storage method. The method includes: obtaining, by a storage controller, a first storage request instruction sequence, where the first storage request instruction sequence is constituted by writing, by a host, a first instruction code and address information that are carried in a key-value storage request to a field defined in a protocol, where the first instruction code is an instruction code defined based on a reserved extension field in the protocol; extracting, by the storage controller, the first instruction code and the address information from the first storage request instruction sequence; and performing, by the storage controller, an operation corresponding to the first instruction code on a storage device based on the first instruction code and the address information.

In the key-value storage method provided in this embodiment of this application, a key-value storage operation is extended to a storage protocol. Therefore, the host can implement the key-value storage through interaction between the storage protocol and the storage controller, without a need to perform conversion on a block layer or a file system to implement the key-value storage, thereby reducing an I/O path delay of a storage system.

In a possible design, the obtaining, by a storage controller, a first storage request instruction sequence includes: reading, by the storage controller, the first storage request instruction sequence from memory allocated by the host to the first storage request instruction sequence based on the field defined in the protocol. Alternatively, in addition to the foregoing method, the storage controller may directly receive the first storage request instruction sequence sent by the host.

The manner in which the storage controller reads the first storage request instruction sequence from the memory allocated by the host to the first storage request instruction sequence based on the field defined in the protocol can save memory space of the storage controller.

In a possible design, the key-value storage request includes a data write request, a data obtaining request, a data deletion request, or a data discarding request, where address information carried in the data write request includes addresses at which a key and a value are stored; address information carried in the data obtaining request includes information about an address at which a key is stored; address information carried in the data deletion request includes information about an address at which a key is stored; and address information carried in the data discarding request includes information about an address at which a key is stored.

The foregoing descriptions are merely examples of some key-value storage request operations, and there may be other key-value storage request operations. This is not limited in this embodiment of this application.

In a possible design, if the key-value storage request is a data obtaining request, before the obtaining, by a storage controller, a first storage request instruction sequence, the method further includes: obtaining, by the storage controller, a length that is of a value and that is requested by the data obtaining request; and sending, by the storage controller, the length of the value to the host, so that the host allocates memory to the value based on the length of the value; and further, the performing, by the storage controller, an operation corresponding to the first instruction code on a storage device based on the first instruction code and the address information includes: reading, by the storage controller based on the first instruction code and the address information, data to the memory allocated by the host to the value.

In other words, if the key-value storage request is a data obtaining request, the host first needs to allocate the memory to the value. In this way, the data read by the storage controller from the storage device has corresponding storage space.

In a possible design, the obtaining, by the storage controller, a length that is of a value and that is requested by the data obtaining request includes: obtaining, by the storage controller, a second storage request instruction sequence, where the second storage request instruction sequence is constituted by writing, by the host to the field defined in the protocol, an instruction code of obtaining a length of a value corresponding to a key, and information about an address at which the key is stored, where the instruction code of obtaining the length of the value corresponding to the key is an instruction code defined based on the reserved extension field in the protocol; extracting, by the storage controller from the second storage request instruction sequence, the instruction code of obtaining the length of the value corresponding to the key, and the information about the address at which the key is stored; and obtaining, by the storage controller, the length of the value from the storage device based on the instruction code of obtaining the length of the value corresponding to the key, and the information about the address at which the key is stored.

For the manner in which the storage controller obtains the second storage request instruction sequence, refer to the foregoing manner in which the storage controller obtains the first storage request instruction sequence. Details are not described herein again.

In the foregoing manner, the host can obtain the length that is of the value and that is requested by the data obtaining request.

In a possible design, the key-value storage request is an aggregated key-value storage request including a plurality of single key-value storage requests, where the address information carried in the key-value storage request is indexed by using address information in a scatter gather list, and the scatter gather list includes address information carried in each of the plurality of single key-value storage requests.

The plurality of single key-value storage requests are combined into the aggregated key-value storage request, and the address information carried in each of the plurality of single key-value storage requests is indexed by using the scatter gather list, so that a plurality of single key-value storage operations can be completed at the same time in one key-value storage operation procedure, thereby improving efficiency of key-value storage.

In a possible design, the method further includes: obtaining, by the storage controller, a third storage request instruction sequence, where the third storage request instruction sequence is constituted by writing, by the host, a second instruction code and a data memory pointer that are carried in a non-key-value storage request to the field defined in the protocol, where the second instruction code is a standard instruction code of the protocol; extracting, by the storage controller, the second instruction code and the data memory pointer from the third storage request instruction sequence; and performing, by the storage controller, an operation corresponding to the second instruction code on the storage device based on the second instruction code and the data memory pointer.

For the manner in which the storage controller obtains the third storage request instruction sequence, refer to the foregoing manner in which the storage controller obtains the first storage request instruction sequence. Details are not described herein again.

In the key-value storage method provided in this embodiment of this application, the host can implement non-key-value storage through the interaction between the storage protocol and the storage controller. Therefore, conventional block device storage can be supported while the key-value storage is supported.

According to still another aspect, an embodiment of this application provides a host. The host includes a processing module and a communications module, where the processing module is configured to: after a key-value storage request is detected, write a first instruction code and address information that are carried in the key-value storage request to a field defined in a protocol, to constitute a first storage request instruction sequence, where the first instruction code is an instruction code defined based on a reserved extension field in the protocol; and the communications module is configured to interact with the storage controller, so that the storage controller obtains the first storage request instruction sequence.

In a possible design, the processing module is configured to: allocate memory to the first storage request instruction sequence based on the field defined in the protocol; and write the first instruction code and the address information that are carried in the key-value storage request to the memory; and the communications module is configured to: instruct the storage controller to read the first storage request instruction sequence from the memory; or send the first storage request instruction sequence to the storage controller.

In a possible design, the key-value storage request includes a data write request, a data obtaining request, a data deletion request, or a data discarding request, where address information carried in the data write request includes information about addresses at which a key and a value are stored; address information carried in the data obtaining request includes information about an address at which a key is stored; address information carried in the data deletion request includes information about an address at which a key is stored; and address information carried in the data discarding request includes information about an address at which a key is stored.

In some possible designs, if the key-value storage request is a data obtaining request, the processing module is further configured to: after the key-value storage request is detected, and before writing the first instruction code and the address information that are carried in the key-value storage request to the field defined in the protocol, to constitute the first storage request instruction sequence, obtain a length that is of a value and that is requested by the data obtaining request; and allocate memory to the value based on the length of the value, so that after the communications module interacts with the storage controller and the storage controller obtains the first storage request instruction sequence, the storage controller reads data to the memory allocated by the processing module to the value.

In a possible design, the processing module is configured to: write, to the field defined in the protocol, an instruction code of obtaining a length of a value corresponding to a key, and information about an address at which the key is stored, to constitute a second storage request instruction sequence, where the instruction code of obtaining the length of the value corresponding to the key is an instruction code defined based on the reserved extension field in the protocol; interact with the storage controller by using the communications module, so that the storage controller obtains the second storage request instruction sequence; and receive, by using the communications module, the length that is of the value and that is sent by the storage controller.

In a possible design, the key-value storage request is an aggregated key-value storage request including a plurality of single key-value storage requests, where the address information carried in the key-value storage request is indexed by using address information in a scatter gather list, and the scatter gather list includes address information carried in each of the plurality of single key-value storage requests.

In a possible design, the processing module is further configured to: after a non-key-value storage request is detected, write a second instruction code and a data memory pointer that are carried in the non-key-value storage request to the field defined in the protocol, to constitute a third storage request instruction sequence, where the second instruction code is a standard instruction code of the protocol; and the communications module is further configured to interact with the storage controller, so that the storage controller obtains the third storage request instruction sequence.

The host provided in this embodiment of this application may be configured to perform the function performed by the host in the foregoing method embodiment. Therefore, for a technical effect that can be obtained by the host provided in this embodiment of this application, refer to related descriptions in the foregoing method embodiment. Details are not described herein again.

According to still another aspect, an embodiment of this application provides a storage controller. The storage controller includes a front-end communications module, a back-end communications module, a processing module, and a control module, where the front-end communications module is configured to obtain a first storage request instruction sequence from a host, where the first storage request instruction sequence is constituted by writing, by the host, a first instruction code and address information that are carried in a key-value storage request to a field defined in a protocol, where the first instruction code is an instruction code defined based on a reserved extension field in the protocol; the processing module is configured to extract the first instruction code and the address information from the first storage request instruction sequence; and the control module is configured to perform, by using the back-end communications module, an operation corresponding to the first instruction code on a storage device based on the first instruction code and the address information.

In a possible design, the front-end communications module is configured to: read the first storage request instruction sequence from memory allocated by the host to the first storage request instruction sequence based on the field defined in the protocol; or receive the first storage request instruction sequence sent by the host.

In a possible design, the key-value storage request includes a data write request, a data obtaining request, a data deletion request, or a data discarding request, where address information carried in the data write request includes addresses at which a key and a value are stored; address information carried in the data obtaining request includes information about an address at which a key is stored; address information carried in the data deletion request includes information about an address at which a key is stored; and address information carried in the data discarding request includes information about an address at which a key is stored.

In a possible design, if the key-value storage request is a data obtaining request, the processing module is further configured to: before the front-end communications module obtains the first storage request instruction sequence, obtain a length that is of a value and that is requested by the data obtaining request; the communications module is further configured to send the length of the value to the host, so that the host allocates memory to the value based on the length of the value; and the control module is configured to: read, based on the first instruction code and the address information, data to the memory allocated by the host to the value.

In a possible design, the processing module is configured to:

obtain, by using the front-end communications module, a second storage request instruction sequence, where the second storage request instruction sequence is constituted by writing, by the host to the field defined in the protocol, an instruction code of obtaining a length of a value corresponding to a key, and information about an address at which the key is stored, where the instruction code of obtaining the length of the value corresponding to the key is an instruction code defined based on the reserved extension field in the protocol; extract, from the second storage request instruction sequence, the instruction code of obtaining the length of the value corresponding to the key, and the information about the address at which the key is stored; and obtain, by using the control module and the back-end communications module, the length of the value from the storage device based on the instruction code of obtaining the length of the value corresponding to the key, and the information about the address at which the key is stored.

In a possible design, the key-value storage request is an aggregated key-value storage request including a plurality of single key-value storage requests, where the address information carried in the key-value storage request is indexed by using address information in a scatter gather list, and the scatter gather list includes address information carried in each of the plurality of single key-value storage requests.

In a possible design, the front-end communications module is further configured to obtain a third storage request instruction sequence from the host, where the third storage request instruction sequence is constituted by writing, by the host, a second instruction code and a data memory pointer that are carried in a non-key-value storage request to the field defined in the protocol, where the second instruction code is a standard instruction code of the protocol; the processing module is further configured to extract the second instruction code and the data memory pointer from the third storage request instruction sequence; and the control module is further configured to perform, by using the back-end communications module, an operation corresponding to the second instruction code on the storage device based on the second instruction code and the data memory pointer.

The storage controller provided in this embodiment of this application may be configured to perform the function performed by the storage controller in the foregoing method embodiment. Therefore, for a technical effect that can be obtained by the storage controller provided in this embodiment of this application, refer to related descriptions in the foregoing method embodiment. Details are not described herein again.

Based on the foregoing aspects, in a possible design, the protocol according to any one of the foregoing aspects includes a non-volatile memory express NVMe protocol, where the NVMe protocol defines bytes 0 to 63 as the field for storing the request instruction sequences.

In this embodiment of this application, the key-value storage can be combined with such type of efficient storage protocol as an NVMe protocol. Therefore, a storage system can have key-value storage advantages of simple storage semantics, good storage system scalability, a fast data query speed, and a large data storage capacity, and NVMe protocol advantages of a short I/O path, a low delay, and a strong concurrent processing capability.

Based on the foregoing aspects, in a possible design, the protocol according to any one of the foregoing aspects includes a small computer system interface SCSI protocol.

Because the SCSI protocol is a general storage protocol, combining the key-value storage with the SCSI protocol is more versatile.

Certainly, the foregoing protocol may be another storage protocol. This is not limited in this embodiment of this application.

Based on the foregoing aspects, in a possible design, the instruction sequence according to any one of the foregoing aspects may be in a form of a queue, or may be in another form such as a data packet. This is not limited in this embodiment of this application.

According to still another aspect, an embodiment of this application provides a host. The host can implement a function performed by the host in the foregoing method embodiment. The function may be implemented by using hardware, or may be implemented by using hardware executing corresponding software. The hardware or software includes one or more modules corresponding to the foregoing function.

In a possible design, a structure of the host includes a processor and a communications interface. The processor is configured to support the host in performing the corresponding function in the foregoing method. The communications interface is configured to support the host in communicating with another network element. The host may further include a memory. The memory is coupled to the processor, and configured to store a program instruction and data that are necessary to the host.

According to still another aspect, an embodiment of this application provides a storage controller. The storage controller can implement a function performed by the storage controller in the foregoing method embodiment. The function may be implemented by using hardware, or may be implemented by using hardware executing corresponding software. The hardware or software includes one or more modules corresponding to the foregoing function.

In a possible design, a structure of the storage controller includes a processor and a communications interface. The processor is configured to support the storage controller in performing the corresponding function in the foregoing method. The communications interface is configured to support the storage controller in communicating with another network element. The storage controller may further include a memory. The memory is coupled to the processor, and configured to store a program instruction and data that are necessary to the storage controller.

According to still another aspect, an embodiment of this application provides a key-value storage system, where the key-value storage system includes a storage device, and the host and the storage controller according to the foregoing aspects.

According to yet another aspect, an embodiment of this application provides a computer storage medium, configured to store a computer software instruction used by the foregoing host. The computer storage medium includes a program designed for performing the foregoing aspects.

According to yet another aspect, an embodiment of this application provides a computer storage medium, configured to store a computer software instruction used by the foregoing storage controller. The computer storage medium includes a program designed for performing the foregoing aspects.

BRIEF DESCRIPTION OF DRAWINGS

FIG. 7A, FIG. 7B, and FIG. 7C are a schematic flowchart of key-value storage in a case of a data obtaining request according to an embodiment of this application;

DESCRIPTION OF EMBODIMENTS

Figure 1:
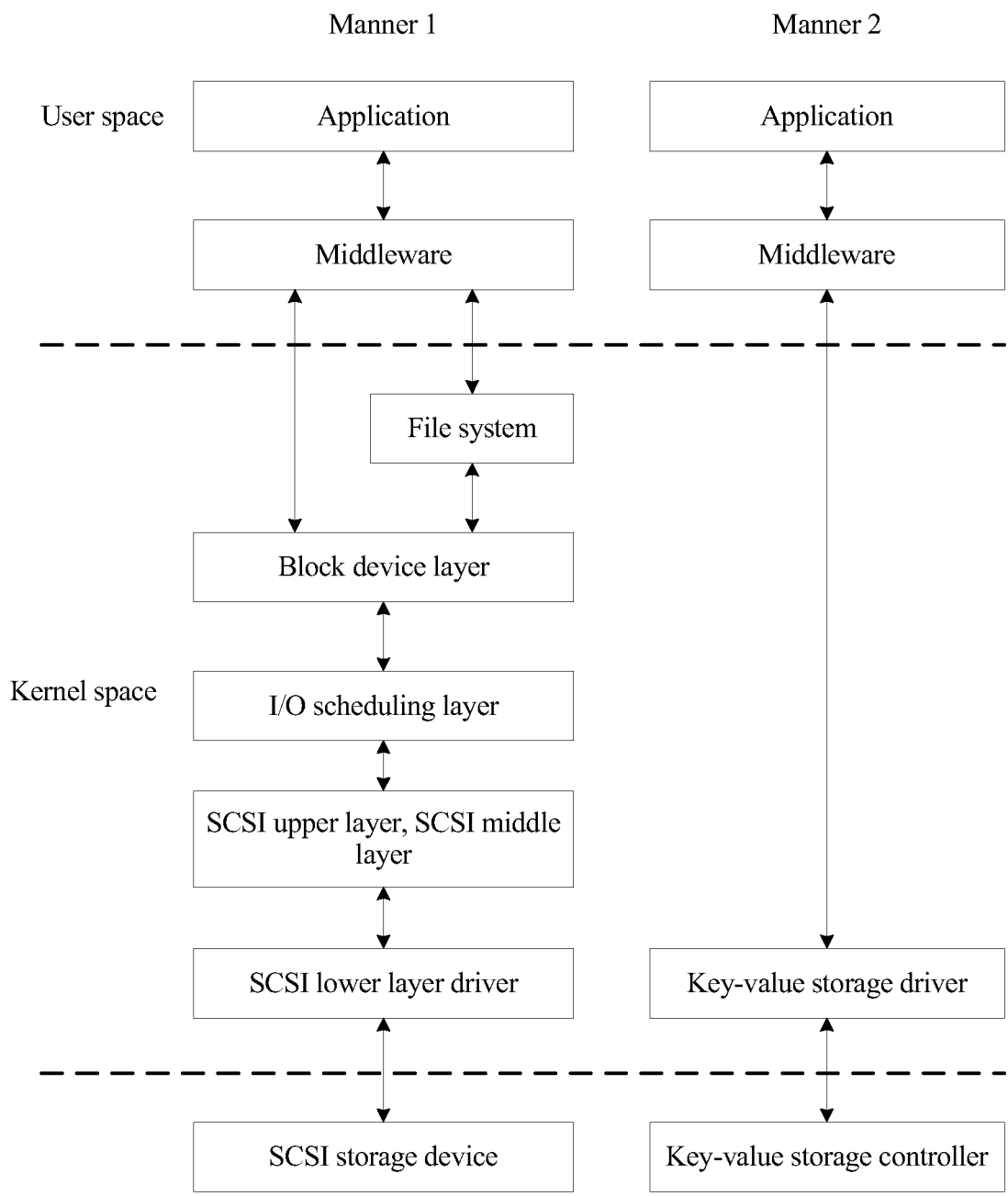
FIG. 1 shows two main existing implementations of key-value storage.

FIG. 1 shows two main existing implementations of key-value storage.

In Manner 1, a SCSI device is used as hardware, and the SCSI device provides an external block device service by using a SCSI lower layer driver, a SCSI middle layer, a SCSI upper layer, an I/O scheduling layer, and a block device layer. For software, middleware is created on a block device layer or a file system, and a key-value operation and conversion of a block device or file system operation are completed on the middleware, to provide a key-value storage service for an application in user space. However, in this manner, multi-layer storage protocol stack conversion results in a large I/O path delay.

In Manner 2, a device supporting key-value storage is used as hardware. The key-value storage device communicates middleware by using a key-value storage driver layer. The middleware converts user storage into a key-value storage operation, to provide a key-value storage service for an application in user space. However, in this manner, a dedicated key-value storage device cannot support a conventional block device storage. Therefore, an application range has limitations.

The embodiments of this application provide a key-value storage method, so that a key-value storage operation can be extended to a storage protocol. Further, an I/O path delay of a storage system can be reduced, and both conventional block device storage and key-value storage can be supported.

The following describes the technical solutions in the embodiments of this application with reference to the accompanying drawings in the embodiments of this application.

It should be noted that, to describe the technical solutions of the embodiments of this application, in the embodiments of this application, the terms "first," "second," and the like are used to distinguish same items or similar items whose functions and actions are basically the same, and a person skilled in the art may understand that the terms "first," "second," and the like do not limit a quantity and an execution order.

It should be noted that, the character "I" in this specification represents the meaning of "or," for example, A/B may represent A or B; and the term "and/or" in this specification describes only an association relationship for describing associated objects and represents that three relationships may exist. For example, A and/or B may represent the following three cases: Only A exists, both A and B exist, and only B exists. "A plurality of" means two or more than two.

Terms such as "component," "module," and "system" used in this application are used to indicate computer-related entities. The computer-related entities may be hardware, firmware, combinations of hardware and software, software, or software in running. For example, a component may be but is not limited to, a process that runs on a processor, a processor, an object, an executable file, a thread of execution, a program, and/or a computer. In an example, both a computing device and an application that runs on the computing device may be components. One or more components may reside within a process and/or a thread of execution, and a component may be located on one computer and/or distributed between two or more computers. In addition, these components may be executed from various computer-readable media that have various data structures. These components may communicate in a local and/or remote process manner based on, for example, signals having one or more data packets (for example, data from one component that interacts with a local system, another component of a distributed system, and/or interacts with another system by using a network such as the Internet in a manner of a signal).

It should be noted that, in the embodiments of this application, the words "for example" or "such as" are used to mean an example, an illustration, or a description. Any embodiment or design scheme described as "an example of" or "for example" in the embodiments of this application should not be explained as being more preferred or having more advantages than another embodiment or design scheme. Exactly, use of the term "example" is intended to present a concept in a specific manner.

It should be noted that, in the embodiments of this application, unless otherwise provided, "a plurality of" means two or more than two. For example, a plurality of data packets are two or more data packets.

It should be noted that in the embodiments this application, "of," "relevant," and "corresponding" may be interchangeably used sometimes. It should be noted that, consistent meanings are expressed when differences are not emphasized.

It should be noted that, network architectures and service scenarios described in the embodiments of this application aim to describe the technical solutions in the embodiments of this application, but are not intended to limit the technical solutions provided in the embodiments of this application. A person of ordinary skill in the art may know that as the network architectures evolve and a new business scenario emerges, the technical solutions provided in the embodiments of this application further apply to a similar technical problem.

Figure 2:
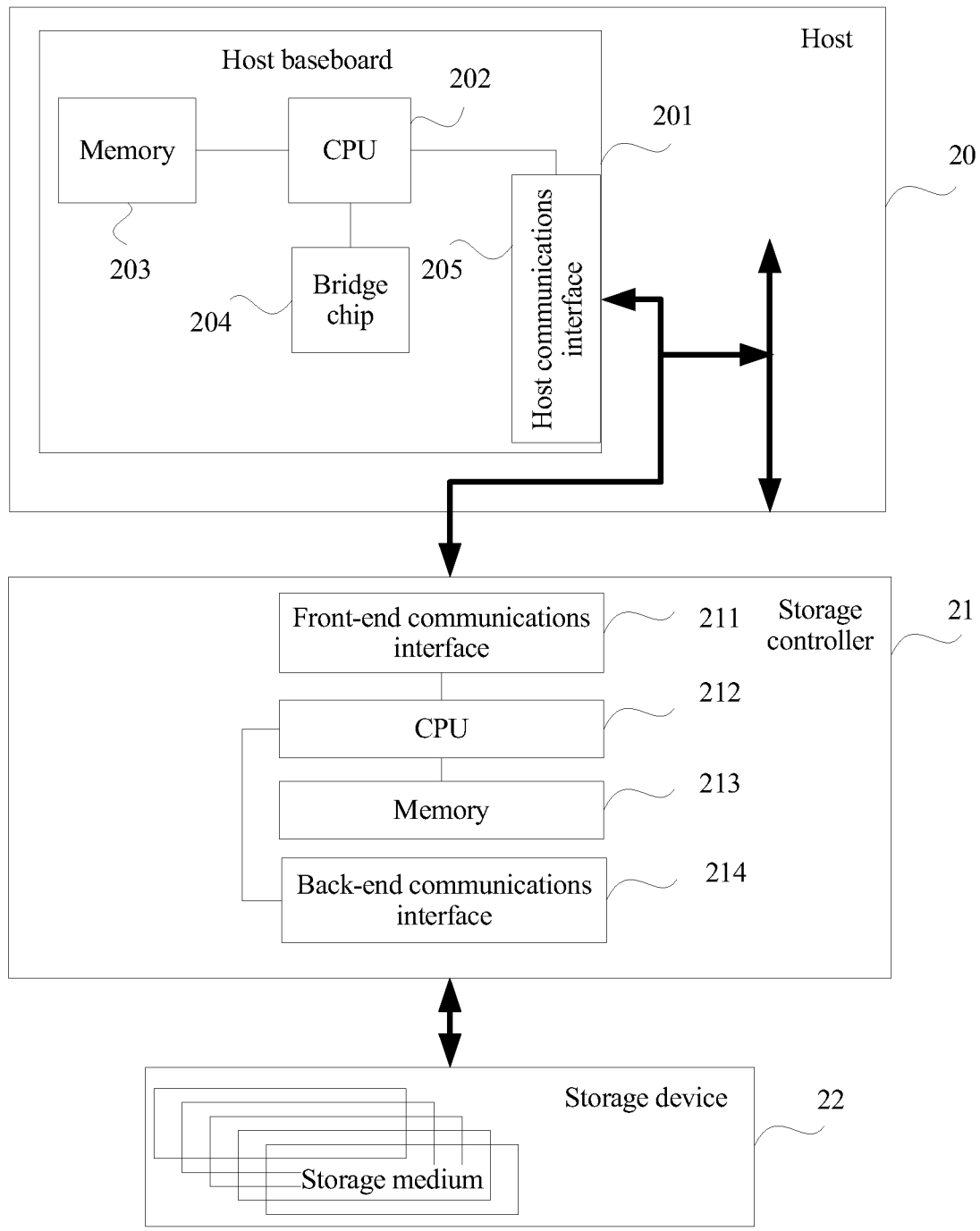
FIG. 2 is a schematic architectural diagram of a key-value storage system according to an embodiment of this application.

FIG. 2 is a schematic architectural diagram of a key-value storage system according to an embodiment of this application. The key-value storage system includes a host 20, a storage controller 21, and a storage device 22. The host 20 performs a key-value storage operation on a storage medium in the storage device 22 by using the storage controller 21. The storage controller 21 is configured to process a key-value storage request and perform a data access operation on the storage device 22.

As shown in FIG. 2, the host 20 may include a host baseboard 201, and further include a central processing unit (CPU) 202, a memory 203, a bridge chip 204, and a host communications interface 205 that are deployed on the host baseboard 201.

The memory 203 stores a program instruction and data that are necessary for the host 20 to run. The CPU 202 is configured to process the program instruction of the host 20. The bridge chip 204 is configured to connect various peripheral devices (not shown) on the host baseboard 201. The host communications interface 205 is a bus interface used by the host 20 to connect to the storage controller 21, and configured to complete communication between the host 20 and the storage controller 21.

The storage controller 21 may include a front-end communications interface 211, a CPU 212, a memory 213, and a back-end communications interface 214.

The memory 213 is configured to store a program instruction and data necessary for the storage controller 21 to run. The CPU 212 is configured to process an instruction and an operation that are run by the storage controller 21. The front-end communications interface 211 is a bus interface used by the storage controller 21 to connect to the host 20, and configured to complete communication between the storage controller 21 and the host 20. The back-end communications interface 214 is a bus interface used by the storage controller 21 to connect to the storage device 22, and configured to complete communication between the storage controller 21 and the storage device 22.

It should be noted that, in this embodiment of this application, the storage controller 21 and the storage device 22 may be separately deployed, or may be integrated into a same device. This is not limited in this application.

Figure 3:
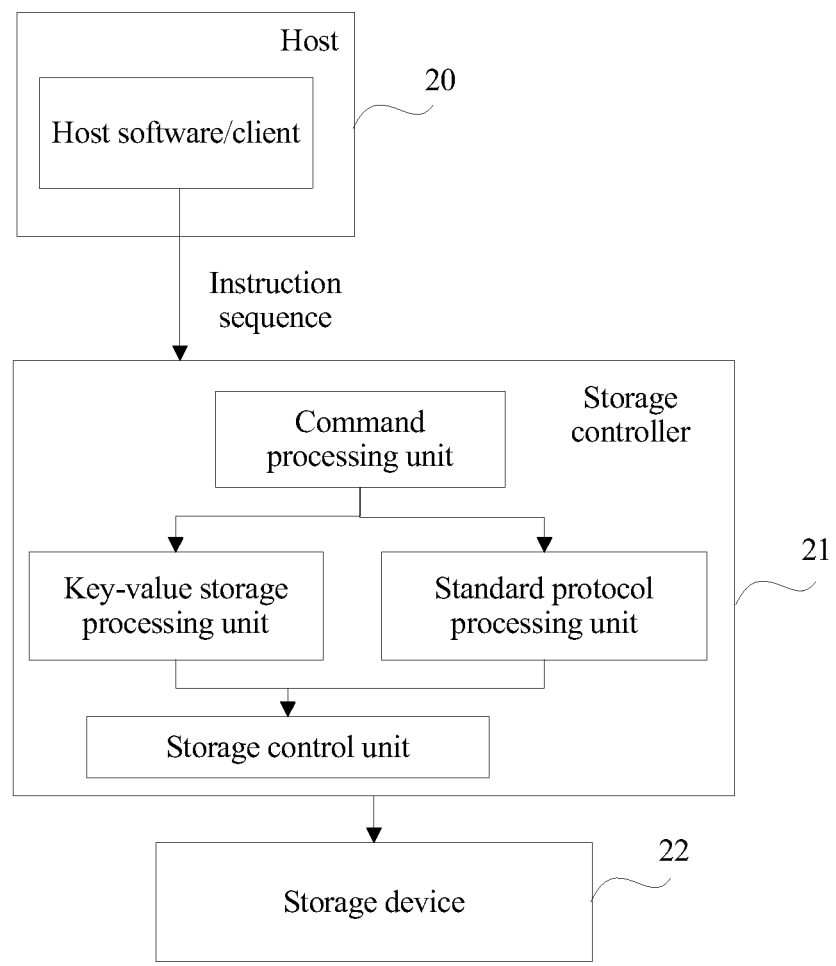
FIG. 3 is a schematic operation module diagram of a key-value storage method according to an embodiment of this application.
Figure 4A:
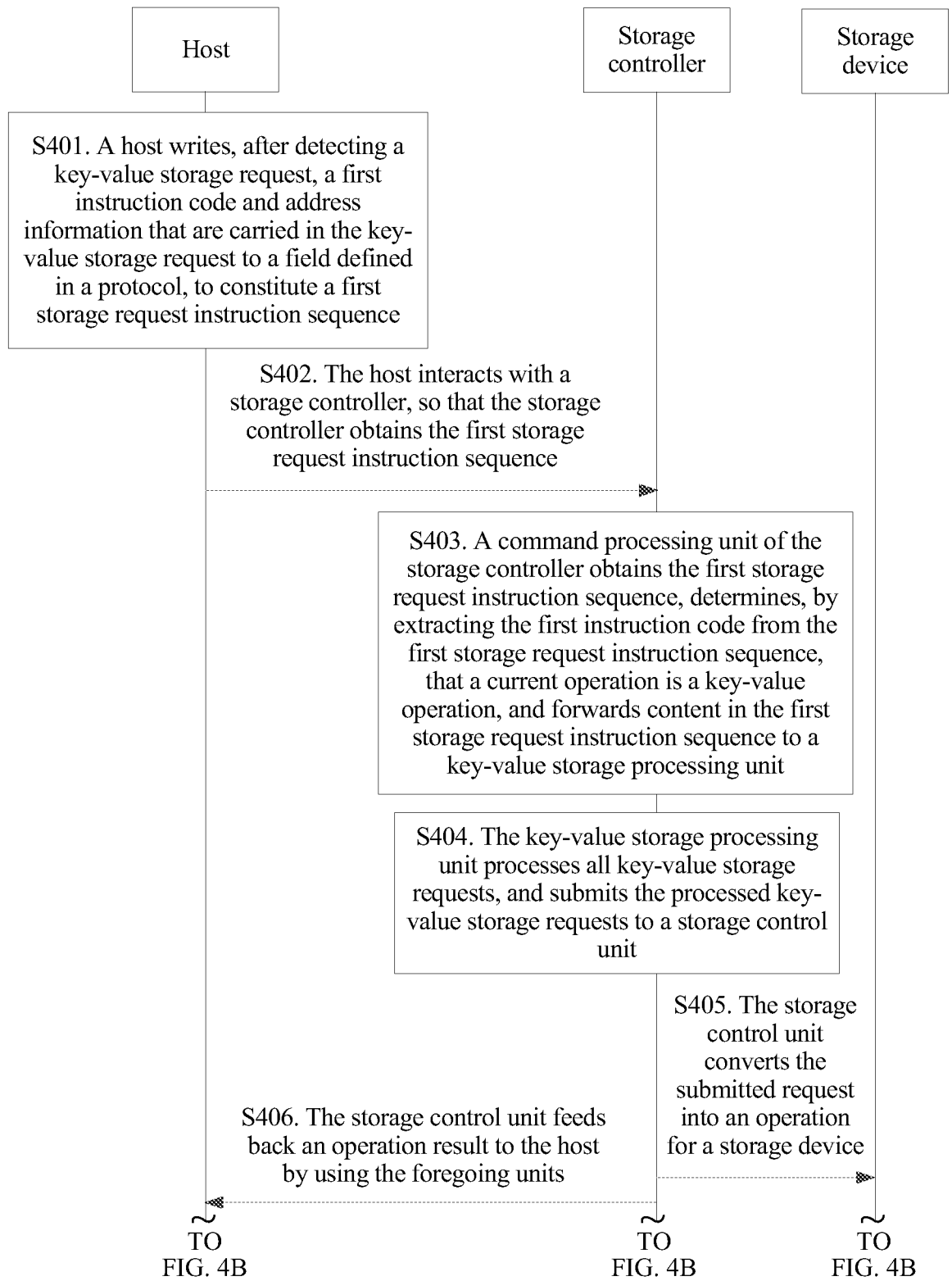
FIG. 4A and FIG. 4B are a schematic flowchart of a key-value storage according to an embodiment of this application.
Figure 4B:
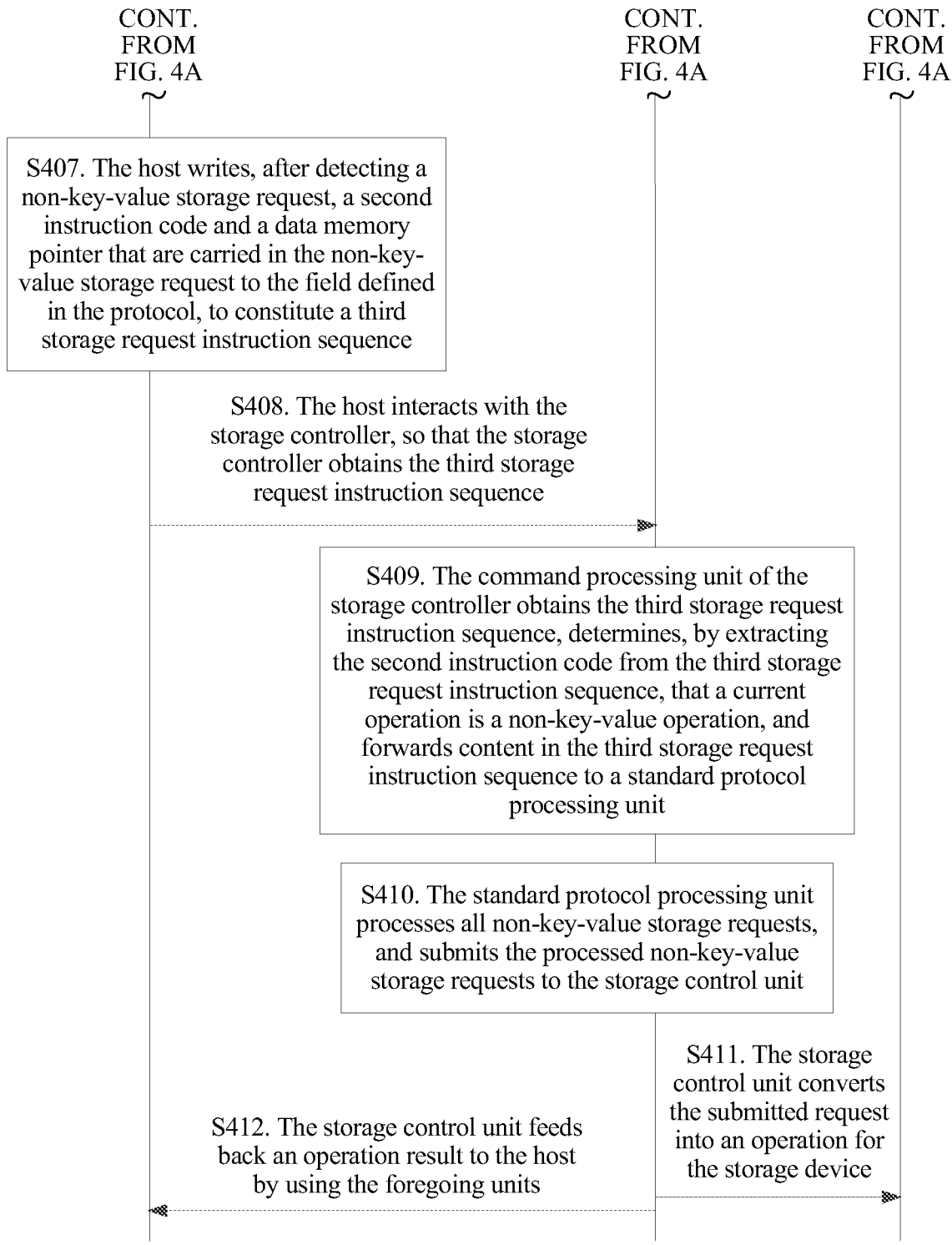

The following describes in detail the key-value storage method provided in the embodiments of this application based on the key-value storage system. First, FIG. 3 and FIG. 4A and FIG. 4B are respectively a schematic operation module diagram and a corresponding schematic flowchart of the key-value storage method according to the embodiments of this application. The key-value storage method may include the following operations.

S401. A host writes, after detecting a key-value storage request, a first instruction code and address information that are carried in the key-value storage request to a field defined in a protocol, to constitute a first storage request instruction sequence (as shown in Table 1).

The first instruction code is an instruction code defined based on a reserved extension field of a protocol. The reserved extension field in the protocol is a field reserved by the protocol for protocol extension or for user customization.

S402. The host interacts with a storage controller, so that the storage controller obtains the first storage request instruction sequence.

S403. A command processing unit of the storage controller obtains the first storage request instruction sequence, determines, by extracting the first instruction code from the first storage request instruction sequence, that a current operation is a key-value operation, and forwards content in the first storage request instruction sequence to a key-value storage processing unit.

S404. The key-value storage processing unit processes all key-value storage requests, and submits the processed key-value storage requests to a storage control unit.

S405. The storage control unit converts the submitted request into an operation for the storage device.

S406. The storage control unit feeds back an operation result to the host by using the foregoing units.

TABLE 1

| Another instruction field | First instruction code | Address information | Another instruction field |
|---|---|---|---|

S407. The host writes, after detecting a non-key-value storage request, a second instruction code and a data memory pointer that are carried in the non-key-value storage request to the field defined in the protocol, to constitute a third storage request instruction sequence (as shown in Table 2).

The second instruction code is a standard instruction code of the protocol.

S408. The host interacts with the storage controller, so that the storage controller obtains the third storage request instruction sequence.

S409. The command processing unit of the storage controller obtains the third storage request instruction sequence, determines, by extracting the second instruction code from the third storage request instruction sequence, that a current operation is a non-key-value operation, and forwards content in the third storage request instruction sequence to a standard protocol processing unit.

S410. The standard protocol processing unit processes all non-key-value storage requests, and submits the processed non-key-value storage requests to the storage control unit.

S411. The storage control unit converts the submitted request into an operation for the storage device.

S412. The storage control unit feeds back an operation result to the host by using the foregoing units.

TABLE 2

| Another instruction field | Second instruction code | Data memory pointer | Another instruction field |
|---|---|---|---|

The foregoing protocol may be an NVMe protocol, or may be another storage protocol such as a SCSI protocol. This is not limited in this embodiment of this application.

The foregoing instruction sequence may be in a form of a queue, or may be in another form such as a data packet. This is not limited in this embodiment of this application.

The foregoing key-value storage operation may be a data write operation, a data obtaining operation, a data deletion operation, or a data discarding operation. This is not limited in this embodiment of this application.

In the key-value storage method provided in this embodiment of this application, the key-value storage operation is extended to the storage protocol. Therefore, the host can implement the key-value storage through interaction between the storage protocol and the storage controller, without a need to perform conversion on a block layer or a file system to implement the key-value storage, thereby reducing an I/O path delay of a storage system. In addition, the host can implement non-key-value storage through the interaction between the storage protocol and the storage controller. Therefore, conventional block device storage can also be supported.

Optionally, operation S401 may include:
allocating, by the host after detecting the key-value storage request, memory to the first storage request instruction sequence based on the field defined in the protocol; and writing, by the host, the first instruction code and the address information that are carried in the key-value storage request to the memory.

Further, operation S402 may include:
instructing, by the host, the storage controller to read the first storage request instruction sequence from the memory; or sending, by the host, the first storage request instruction sequence to the storage controller.

The manner in which the host instructs the storage controller to read the first storage request instruction sequence from the memory can save memory space of the storage controller.

It should be noted that, this embodiment of this application provides merely examples of two manners in which the host interacts with the storage controller, so that the storage controller obtains the first storage request instruction sequence. Certainly, the host may interact with the storage controller in another manner, so that the storage controller obtains the first storage request instruction sequence. This is not limited in this embodiment of this application.

The following further describes the key-value storage method provided in the embodiments of this application with reference to a specific protocol and a specific key-value storage operation or a specific non-key-value storage operation.

Figure 5:
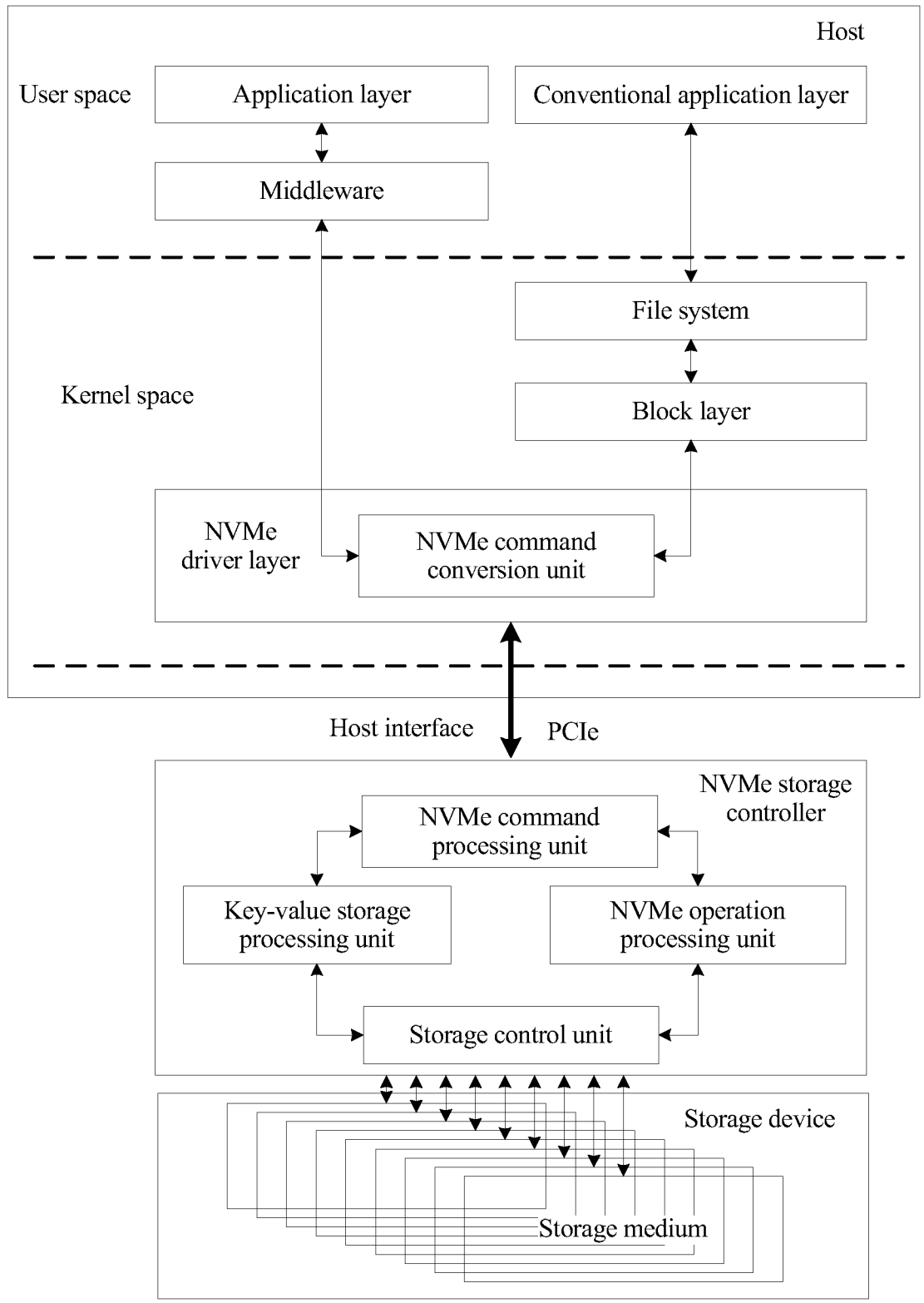
FIG. 5 is a schematic operation flowchart showing that key-value storage is combined with an NVMe protocol to implement key-value storage according to an embodiment of this application.

FIG. 5 is a schematic operation flowchart showing that key-value storage is combined with an NVMe protocol to implement key-value storage.

First, related units in FIG. 5 are briefly described:
1. Host interface:
A host is connected to a storage controller by using the host interface. The host exchanges instructions, addresses, and data with the storage controller by using the host interface. In this embodiment of this application, the host interface is a Peripheral Component Interconnect Express (PCIe) interface.

2. Host software module:
(1) An application layer: a host application program or storage client software.
(2) A conventional application layer: a host application program based on a conventional file system or a block device interface.
(3) Middleware: key-value storage middleware, providing a key-value storage interface for a host application, and transferring a storage request to an NVMe driver layer.
(4) A file system: for example, EXT3, EXT4, or FAT32.
(5) A block layer: an abstraction layer of an operating system for a block storage device, and usually a file system is built at this layer.
(6) An NVMe driver layer: a host operating system transmits data and exchanges a command by using driver software and an NVMe storage controller.
(7) An NVMe command conversion unit: located at an NVMe driver layer, and configured to: fill an NVMe sending queue with information such as an extension instruction of the key-value (KV) storage and an address at which a key and/or a value is stored, and submit the NVMe sending queue to the NVMe driver layer, so that the NVMe driver layer delivers the NVMe sending queue to an NVMe storage controller.

3. NVMe storage controller:
(1) An NVMe command processing unit: analyzing an instruction code in an NVMe sending queue received by an NVMe controller, and distributing the NVMe sending queue to a key-value storage processing unit or an NVMe operation processing unit according to different instructions.

(2) A key-value storage processing unit: processing all key-value operation requests, and submitting the processed requests to a storage control unit.

(3) An NVMe operation processing unit: processing a standard NVMe protocol operation request.

(4) A storage control unit: converting the submitted request into an operation for the storage device, and feeding back an operation result to a data storage operation performed on a storage device.

4. Storage device:

A storage medium in the storage device includes a dynamic random access memory (DRAM), a non-volatile random access memory (NVRAM), a NAND, or another storage device.

Further, an instruction code defined by an NVMe I/O queue operation in the NVMe protocol, as shown in Table 3:

TABLE 3

| Operation code (07) Standard command | Operation code (06:02) Function | Operation code (01:00) Data transfer | Operation code[2] | O/M[1] | Command[3] |
|---|---|---|---|---|---|
| 0b | 000 00b | 00b | 00h | M | Refresh: Flush |
| 0b | 000 00b | 01b | 01h | M | Write: Write |
| 0b | 000 00b | 10b | 02h | M | Read: Read |
| 0b | 000 01b | 00b | 04h | O | Write uncorrectable: Write Uncorrectable |
| 0b | 000 01b | 01b | 05h | O | Compare: Compare |
| 0b | 000 10b | 00b | 08h | O | Write zeroes: Write Zeroes |
| 0b | 000 10b | 01b | 09h | O | Data management: Dataset Management |
| 0b | 000 11b | 01b | 0Dh | O4 | Reservation register: Reservation Register |
| 0b | 000 11b | 10b | 0Eh | O4 | Reservation report: Reservation Report |
| 0b | 001 00b | 01b | 11h | O4 | Reservation acquire: Reservation Acquire |
| 0b | 001 01b | 01b | 15h | O4 | Reservation release: Reservation Release |
| Vendor specific | | | | | |
| 1b | na | Na | 80h-FFh | O | Vendor specific: |

In this embodiment of this application, the first instruction code carried in the key-value storage request is defined based on the reserved extension field of the NVMe protocol, as shown in Table 4.

TABLE 4

| Operation code (07) Standard command | Operation code (06:02) Function | Operation code (01:00) Data transfer | Operation code[2] | Command[3] |
|---|---|---|---|---|
| 1b | na | na | 80h | Write data once: Write |
| 1b | na | na | 81h | Obtain a length of a value corresponding to a key once: GetLength |
| 1b | na | na | 82h | Obtain data once: Read |
| 1b | na | na | 83h | Delete data once: Delete |
| 1b | na | na | 84h | Discard data once: TRIM |
| 1b | na | na | 85h | Write data in an aggregated manner: Write |
| 1b | na | na | 86h | Obtain a length of a value corresponding to a key in an aggregated manner: GetLength |
| 1b | na | na | 87h | Obtain data in an aggregated manner: Read |
| 1b | na | na | 88h | Delete data in an aggregated manner: Delete |
| 1b | na | na | 89h | Discard data in an aggregated manner: TRIM |

It should be noted that, Table 4 is merely an example of a manner of defining, based on the reserved extension field of the NVMe protocol, the first instruction code carried in the key-value storage request. Certainly, the manner of defining, based on the reserved extension field of the NVMe protocol, the first instruction code carried in the key-value storage request is not limited to the foregoing manner. For example, the foregoing key-value storage operation may be defined in fields 90*h* to 99*h*. This is not limited in this embodiment of this application.

As described above, the key-value (Key-Value) storage operation in this embodiment includes but is not limited to: writing data: Put (String Key, String Value); obtaining data: Get (String Key); deleting data: Delete (String Key); and discarding data: TRIM (String Key). This is not limited in this embodiment of this application.

The following describes the foregoing key-value storage operations in detail with reference to FIG. 5.

Example 1

Figure 6A:
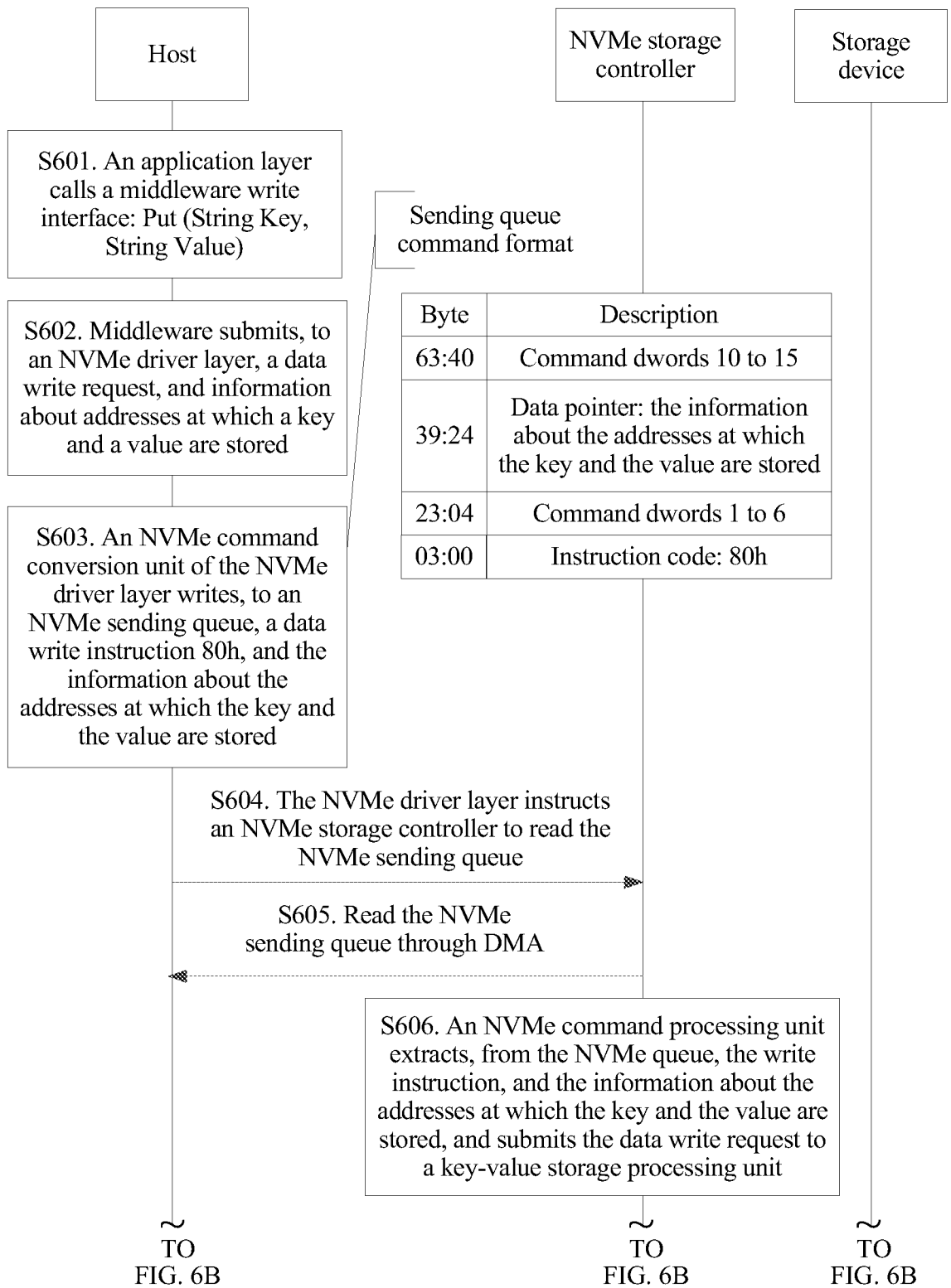
FIG. 6A and FIG. 6B are a schematic flowchart of key-value storage in a case of a data write request according to an embodiment of this application.
Figure 6B:
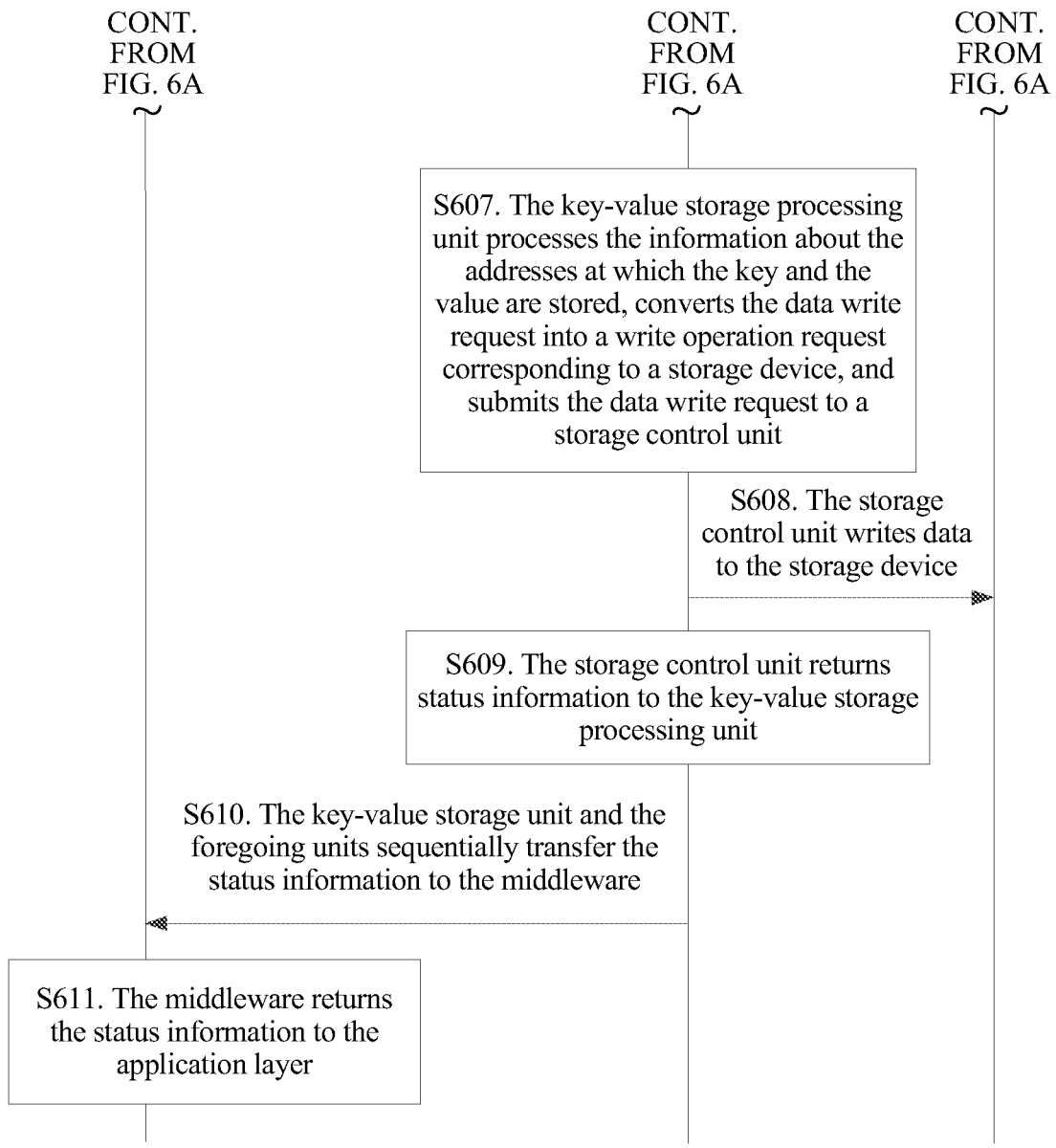

When the key-value storage request is a single data write request, as shown in FIG. 6A and FIG. 6B, the key-value storage method provided in this embodiment of this application includes operations S601 to S611.

S601. An application layer calls a middleware write interface: Put (String Key, String Value).

S602. Middleware submits, to an NVMe driver layer, a data write request, and information about addresses at which a key and a value are stored.

S603. An NVMe command conversion unit of the NVMe driver layer writes, to an NVMe sending queue, a data write instruction 80*h*, and the information about the addresses at which the key and the value are stored.

In an NVMe protocol, bytes 0 to 63 are defined as a field corresponding to the NVMe sending queue. In this operation, a command format of the NVMe sending queue is a sending queue command format shown in FIG. 6A and FIG. 6B. Bytes 03:00 (byte 0 to byte 3) are bytes corresponding to an instruction code. Bytes 23:04 (byte 4 to byte 23) are command dwords 1 to 6 (dword 1 to dword 6 of a command word). Bytes 39:24 (byte 24 to byte 39) are bytes corresponding to the information about the addresses at which the key and the value are stored. Bytes 63: 40 (byte 40 to byte 63) are command dwords 10 to 15 (dword 10 to dword 15 of a command word).

It should be noted that, the NVMe sending queue in this embodiment of this application is a specific form of the foregoing instruction sequence. Certainly, as described above, the form of the instruction sequence in this embodiment of this application may be another form such as a data packet. This is not limited in this embodiment of this application.

S604. The NVMe driver layer instructs an NVMe storage controller to read the NVMe sending queue.

S605. An NVMe command processing unit of the NVMe storage controller reads the NVMe sending queue through direct data access (DMA).

S606. The NVMe command processing unit extracts, from the NVMe sending queue, the data write instruction, and the information about the addresses at which the key and the value are stored, and submits the data write request to a key-value storage processing unit.

S607. The key-value storage processing unit processes the information about the addresses at which the key and the value are stored, converts the data write request into a data write request corresponding to a storage device, and submits the data write request to a storage control unit.

S608. The storage control unit writes data to the storage device based on the information about the addresses at which the key and the value are stored.

S609. The storage control unit returns status information to the key-value storage processing unit.

The status information herein is information about whether data is successfully written.

S610. The key-value storage processing unit and the foregoing units sequentially transfer the status information to the middleware.

As shown in FIG. 5, the foregoing units herein include the NVMe command processing unit of the NVMe storage controller and the NVMe command conversion unit of the NVMe driver layer of a host.

S611. The middleware returns the status information to the application layer.

In this way, when the key-value storage request is a single data write request, the key-value storage process ends.

Example 2

Figure 7A:
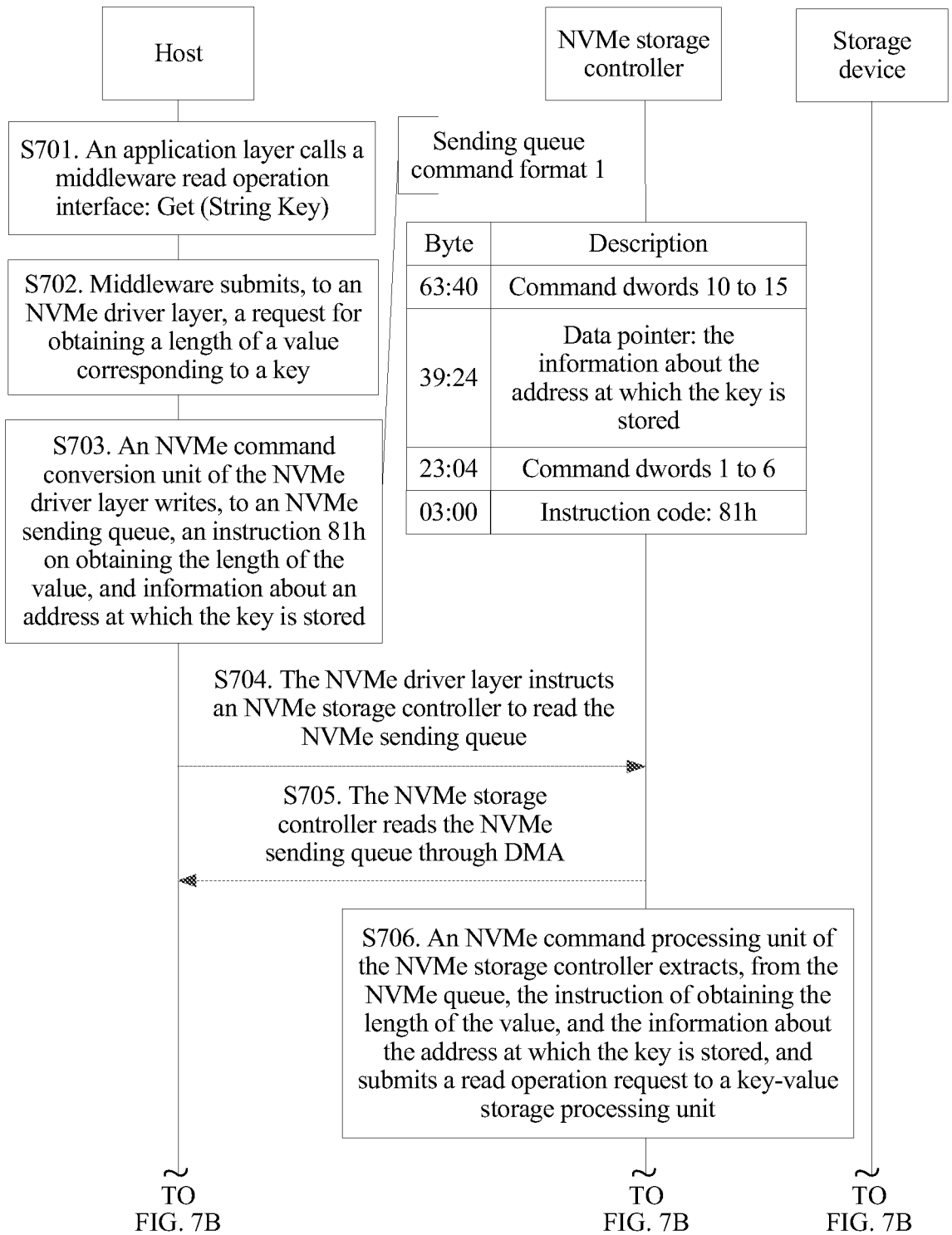
Figure 7C:
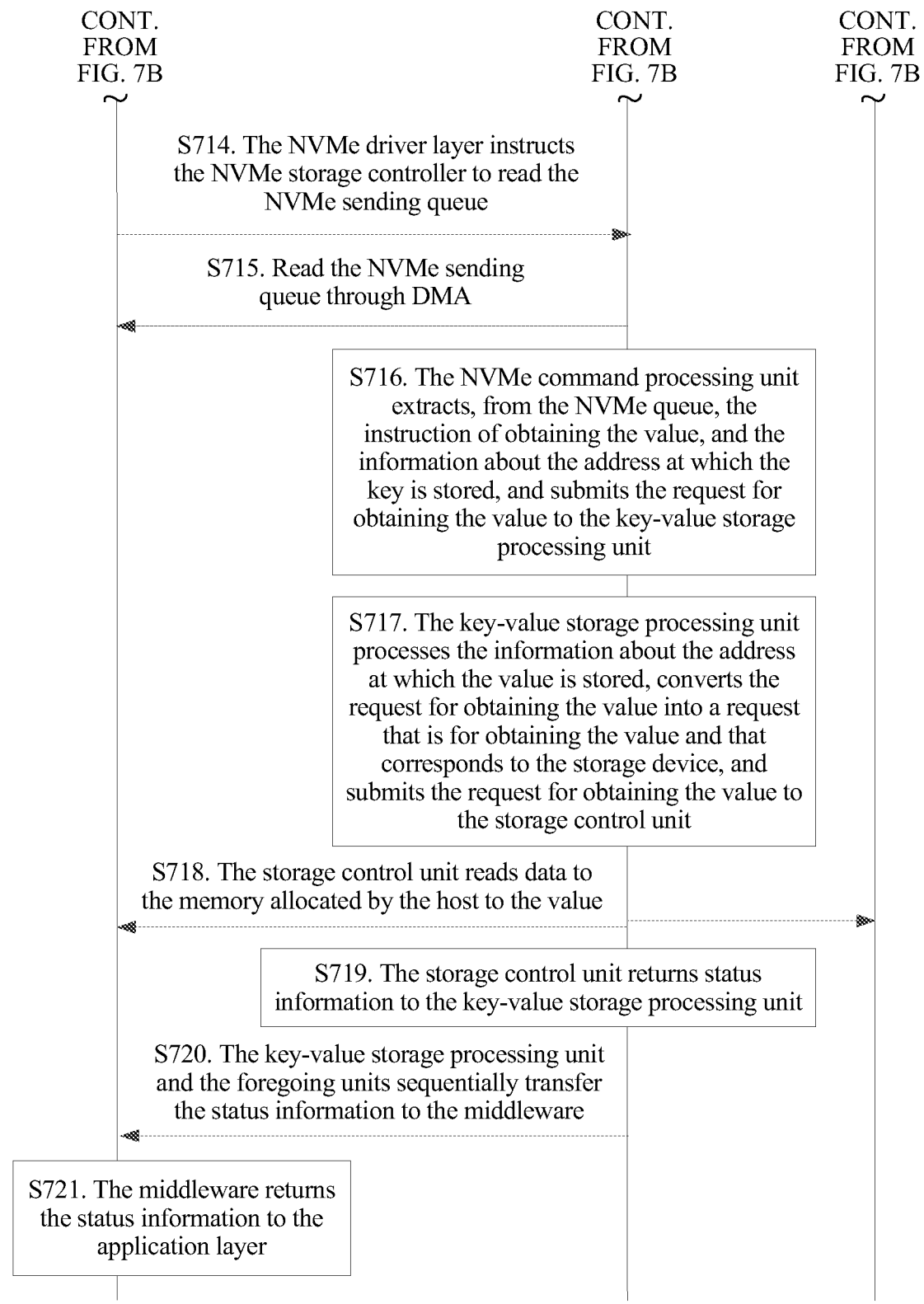

When the key-value storage request is a single data obtaining request, as shown in FIG. 7A, FIG. 7B, and FIG. 7C, the key-value storage method provided in this embodiment of this application includes operations S701 to S721.

S701. An application layer calls a middleware read operation interface: Get (String Key).

S702. Middleware submits, to an NVMe driver layer, a request for obtaining a length of a value corresponding to a key.

S703. An NVMe command conversion unit of the NVMe driver layer writes, to an NVMe sending queue, an instruction 81*h* of obtaining the length of the value, and information about an address at which the key is stored.

In an NVMe protocol, bytes 0 to 64 are defined as a field corresponding to the NVMe sending queue. In this operation, a command format of the NVMe sending queue is a sending queue command format 1 shown in FIG. 7A, FIG. 7B, and FIG. 7C. Bytes 03:00 (byte 0 to byte 3) are bytes corresponding to an instruction code. Bytes 23:04 (byte 4 to byte 23) are command dwords 1 to 6 (dword 1 to dword 6 of a command word). Bytes 39:24 (byte 24 to byte 39) are bytes corresponding to the information about the address at which the key is stored. Bytes 63: 40 (byte 40 to byte 63) are command dwords 10 to 15 (dword 10 to dword 15 of a command word).

It should be noted that, the NVMe sending queue in this embodiment of this application is a specific form of the foregoing instruction sequence. Certainly, as described above, the form of the instruction sequence in this embodiment of this application may be another form such as a data packet. This is not limited in this embodiment of this application.

S704. The NVMe driver layer instructs an NVMe storage controller to read the NVMe sending queue.

S705. An NVMe command processing unit of the NVMe storage controller reads the NVMe sending queue through DMA.

S706. The NVMe command processing unit extracts, from the NVMe queue, the instruction of obtaining the length of the value, and the information about the address at which the key is stored, and submits a read operation request to a key-value storage processing unit.

S707. The key-value storage processing unit processes the information about the address at which the key is stored, converts the read operation request into a read operation request corresponding to a storage device, and submits the read operation request to a storage control unit.

S708. The storage control unit obtains, based on the information about the address at which the key is stored, the length corresponding to the value from the storage device.

S709. The storage control unit submits information about the length of the value to the key-value storage processing unit.

S710. The key-value storage processing unit and the foregoing units sequentially transfer the information about the length of the value to the middleware.

As shown in FIG. 5, the foregoing units herein include the NVMe command processing unit of the NVMe storage controller and the NVMe command conversion unit of the NVMe driver layer of a host.

S711. The middleware allocates, based on the length of the value, memory space for storing the value at a host end.

S712. The middleware submits, to the NVMe driver layer, a request for obtaining the value, and information about an address at which the value is stored.

S713. The NVMe command conversion unit of the NVMe driver layer writes, to the NVMe sending queue, an instruction 82*h* of obtaining the value, and the information about the address at which the key is stored.

In the NVMe protocol, bytes 0 to 63 are defined as a field corresponding to the NVMe sending queue. In this operation, a command format of the NVMe sending queue is a sending queue command format 2 shown in FIG. 7A, FIG. 7B, and FIG. 7C. Bytes 03:00 (byte 0 to byte 3) are bytes corresponding to an instruction code. Bytes 23:04 (byte 4 to byte 23) are command dwords 1 to 6 (dword 1 to dword 6 of a command word). Bytes 39:24 (byte 24 to byte 39) are bytes corresponding to the information about the address at which the key is stored. Bytes 63: 40 (byte 40 to byte 63) are command dwords 10 to 15 (dword 10 to dword 15 of a command word).

It should be noted that, the NVMe sending queue in this embodiment of this application is a specific form of the foregoing instruction sequence. Certainly, as described above, the form of the instruction sequence in this embodiment of this application may be another form such as a data packet. This is not limited in this embodiment of this application.

S714. The NVMe driver layer instructs the NVMe storage controller to read the NVMe sending queue.

S715. The NVMe command processing unit of the NVMe storage controller reads the NVMe sending queue through DMA.

S716. The NVMe command processing unit extracts, from the NVMe queue, the instruction of obtaining the value, and the information about the address at which the key is stored, and submits the request for obtaining the value to the key-value storage processing unit.

S717. The key-value storage processing unit processes the information about the address at which the value is stored, converts the request for obtaining the value into a request that is for obtaining the value and that corresponds to the storage device, and submits the request for obtaining the value to the storage control unit.

S718. The storage control unit reads, through DMA, data to a memory address allocated by the host for storing the value.

Optionally, an instruction and data transmission manner between the host and the storage controller may be another transmission manner such as remote direct memory access (RDMA). This is not limited in this embodiment of this application.

S719. The storage control unit returns status information to the key-value storage processing unit.

The status information herein is information about whether data is successfully obtained.

S720. The key-value storage processing unit and the foregoing units sequentially transfer the status information to the middleware.

As shown in FIG. 5, the foregoing units herein include the NVMe command processing unit of the NVMe storage controller and the NVMe command conversion unit of the NVMe driver layer of the host.

S721. The middleware returns the status information to the application layer.

In this way, when the key-value storage request is a single data obtaining request, the key-value storage process ends.

Example 3

Figure 8A:
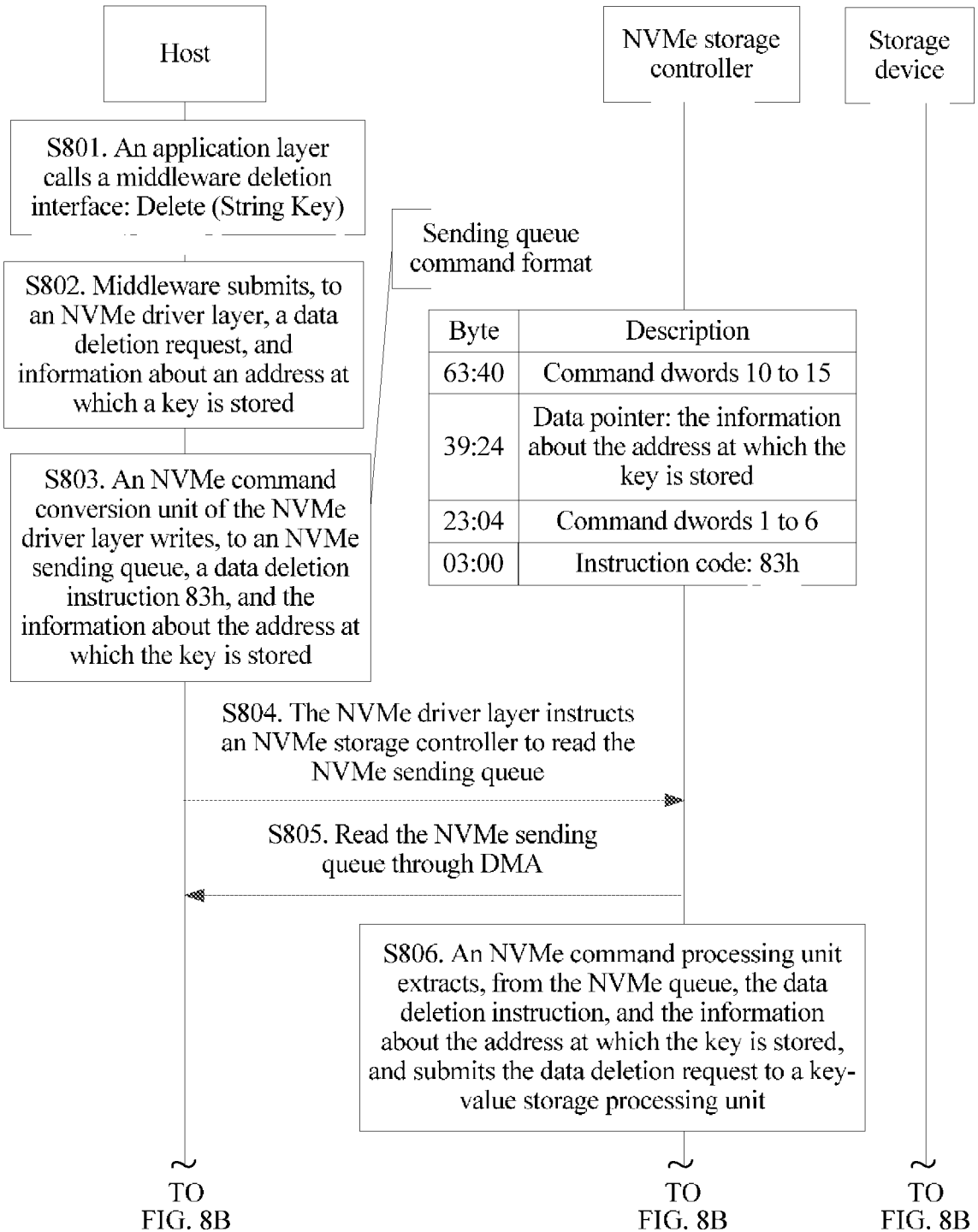
FIG. 8A and FIG. 8B are a schematic flowchart of key-value storage in a case of a data deletion request according to an embodiment of this application.
Figure 8B:
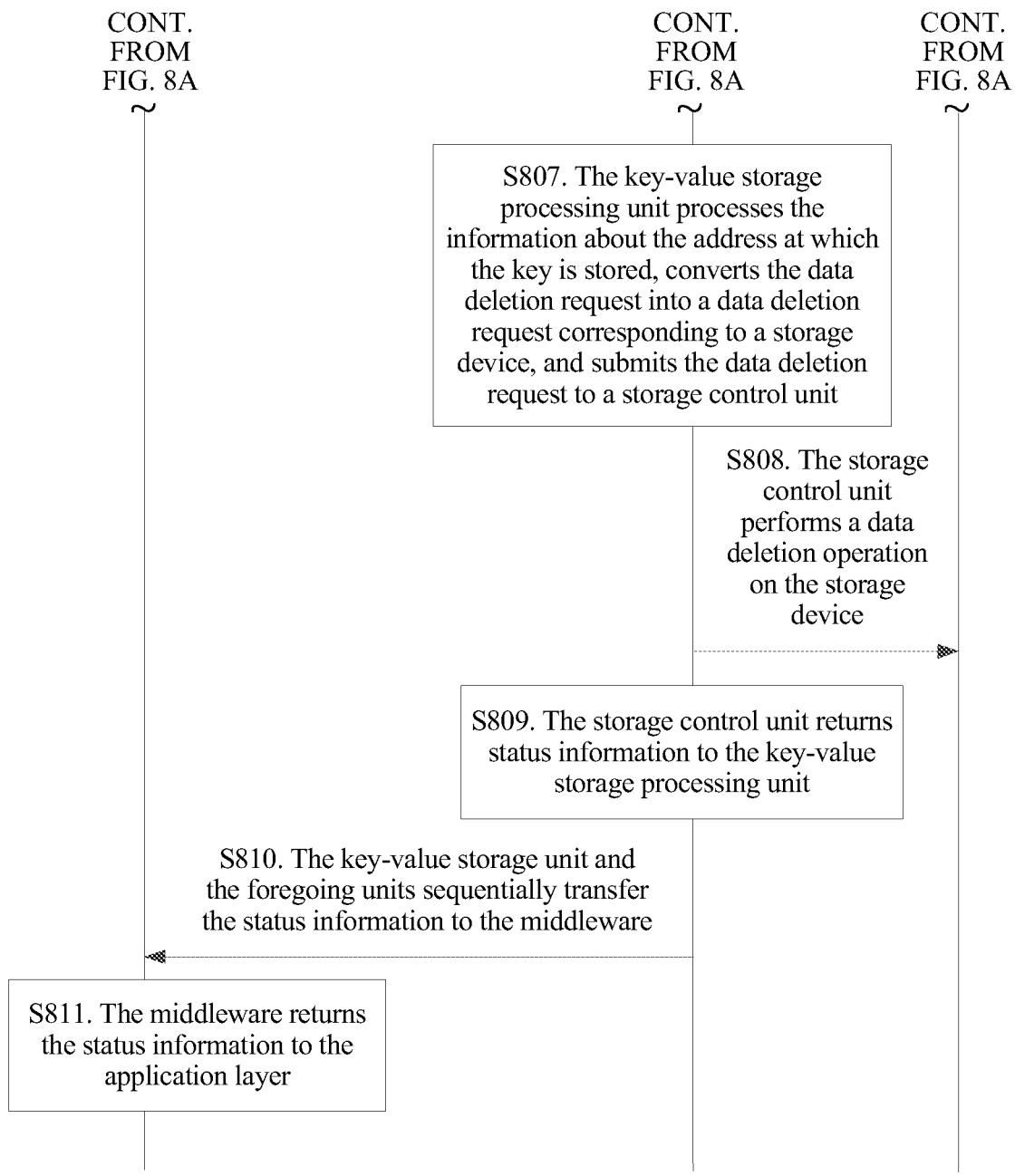

When the key-value storage request is a single data deletion request, as shown in FIG. 8A and FIG. 8B, the key-value storage method provided in this embodiment of this application includes operations S801 to S811.

S801. An application layer calls a middleware deletion interface: Delete (String Key).

S802. Middleware submits, to an NVMe driver layer, a data deletion request, and information about an address at which a key is stored.

S803. An NVMe command conversion unit of the NVMe driver layer writes, to an NVMe sending queue, a data deletion instruction 83h, and the information about the address at which the key is stored.

In an NVMe protocol, bytes 0 to 63 are defined as a field corresponding to the NVMe sending queue. In this operation, a command format of the NVMe sending queue is a sending queue command format shown in FIG. 8A and FIG. 8B. Bytes 03:00 (byte 0 to byte 3) are bytes corresponding to an instruction code. Bytes 23:04 (byte 4 to byte 23) are command dwords 1 to 6 (dword 1 to dword 6 of a command word). Bytes 39:24 (byte 24 to byte 39) are bytes corresponding to the information about the address at which the key is stored. Bytes 63: 40 (byte 40 to byte 63) are command dwords 10 to 15 (dword 10 to dword 15 of a command word).

It should be noted that, the NVMe sending queue in this embodiment of this application is a specific form of the foregoing instruction sequence. Certainly, as described above, the form of the instruction sequence in this embodiment of this application may be another form such as a data packet. This is not limited in this embodiment of this application.

S804. The NVMe driver layer instructs an NVMe storage controller to read the NVMe sending queue.

S805. An NVMe command processing unit of the NVMe storage controller reads the NVMe sending queue through DMA.

S806. The NVMe command processing unit extracts, from the NVMe queue, the data deletion instruction, and the information about the address at which the key is stored, and submits the data deletion request to a key-value storage processing unit.

S807. The key-value storage processing unit processes the information about the address at which the key is stored, converts the data deletion request into a data deletion request corresponding to a storage device, and submits the data deletion request to a storage control unit.

S808. The storage control unit performs, based on the information about the address at which the key stored, a data deletion operation on the storage device.

S809. The storage control unit returns status information to the key-value storage processing unit.

The status information herein is information about whether data is successfully deleted.

S810. The key-value storage processing unit and the foregoing units sequentially transfer the status information to the middleware.

As shown in FIG. 5, the foregoing units herein include the NVMe command processing unit of the NVMe storage controller and the NVMe command conversion unit of the NVMe driver layer of a host.

S811. The middleware returns the status information to the application layer.

In this way, when the key-value storage request is a single data deletion request, the key-value storage process ends.

Example 4

Figure 9A:
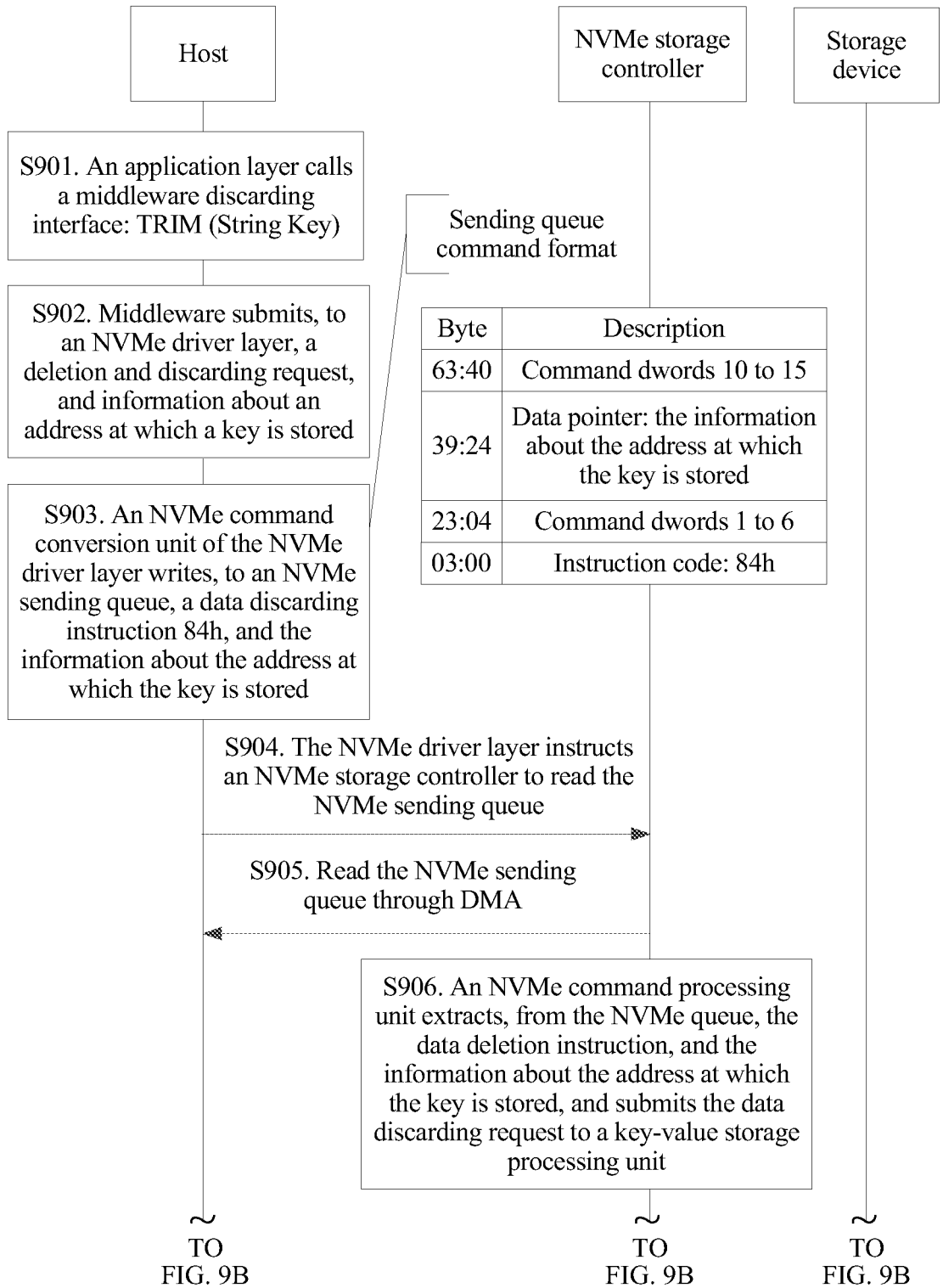
FIG. 9A and FIG. 9B are a schematic flowchart of key-value storage in a case of a data discarding request according to an embodiment of this application.
Figure 9B:
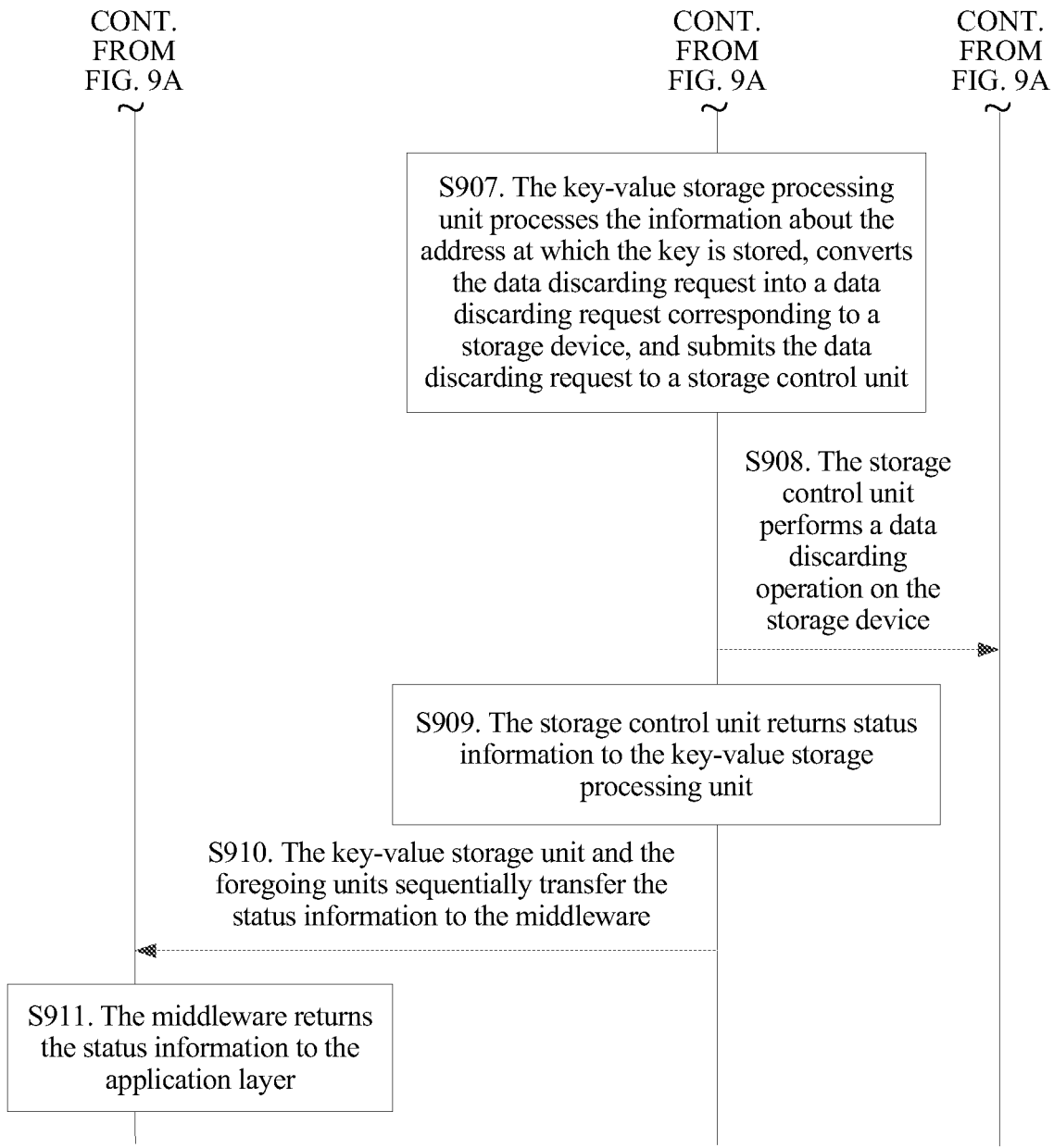

When the key-value storage request is a single data discarding request, as shown in FIG. 9A and FIG. 9B, the key-value storage method provided in this embodiment of this application includes operations S901 to S911.

S901. An application layer calls a middleware discarding interface: TRIM (String Key).

S902. Middleware submits, to an NVMe driver layer, a data discarding request, and information about an address at which a key is stored.

S903. An NVMe command conversion unit of the NVMe driver layer writes, to an NVMe sending queue, a data discarding instruction 84h, and the information about the address at which the key is stored.

In an NVMe protocol, bytes 0 to 63 are defined as a field corresponding to the NVMe sending queue. In this operation, a command format of the NVMe sending queue is a sending queue command format shown in FIG. 9A and FIG. 9B. Bytes 03:00 (byte 0 to byte 3) are bytes corresponding to an instruction code. Bytes 23:04 (byte 4 to byte 23) are command dwords 1 to 6 (dword 1 to dword 6 of a command word). Bytes 39:24 (byte 24 to byte 39) are bytes corresponding to the information about the address at which the key is stored. Bytes 63: 40 (byte 40 to byte 63) are command dwords 10 to 15 (dword 10 to dword 15 of a command word).

It should be noted that, the NVMe sending queue in this embodiment of this application is a specific form of the foregoing instruction sequence. Certainly, as described above, the form of the instruction sequence in this embodiment of this application may be another form such as a data packet. This is not limited in this embodiment of this application.

S904. The NVMe driver layer instructs an NVMe storage controller to read the NVMe sending queue.

S905. An NVMe command processing unit of the NVMe storage controller reads the NVMe sending queue through DMA.

S906. The NVMe command processing unit extracts, from the NVMe queue, the data discarding instruction, and the information about the address at which the key is stored, and submits the data discarding request to a key-value storage processing unit.

S907. The key-value storage processing unit processes the information about the address at which the key is stored, converts the data discarding request into a data discarding request corresponding to a storage device, and submits the data discarding request to a storage control unit.

S908. The storage control unit performs, based on the information about the address at which the key stored, a data discarding operation on the storage device.

S909. The storage control unit returns status information to the key-value storage processing unit.

The status information herein is information about whether data is successfully discarded.

S910. The key-value storage processing unit and the foregoing units sequentially transfer the status information to the middleware.

As shown in FIG. 5, the foregoing units herein include the NVMe command processing unit of the NVMe storage controller and the NVMe command conversion unit of the NVMe driver layer of a host.

S911. The middleware returns the status information to the application layer.

In this way, when the key-value storage request is a single data discarding request, the key-value storage process ends.

The foregoing embodiments shown in FIG. 6A to FIG. 9B are all key-value storage for a single key-value storage request. Table 2 shows that an aggregated operation may be alternatively defined in a process defined by an instruction. The aggregated operation means that one aggregated storage operation request can complete a plurality of single storage operation requests, and a procedure of an aggregated storage operation is basically the same as that of a single request operation. A difference lies in that, information about addresses of a plurality of keys (Key) and/or values (Value) needs to be transferred to the storage controller by using an NVMe sending queue and a scatter gather list (SGL). In other words, information about addresses of a plurality of keys (Key) and/or values (Value) may be indexed by using address information of a scatter gather list. The scatter gather list includes address information carried in each of a plurality of single key-value storage requests.

Example 5

Figure 10A:
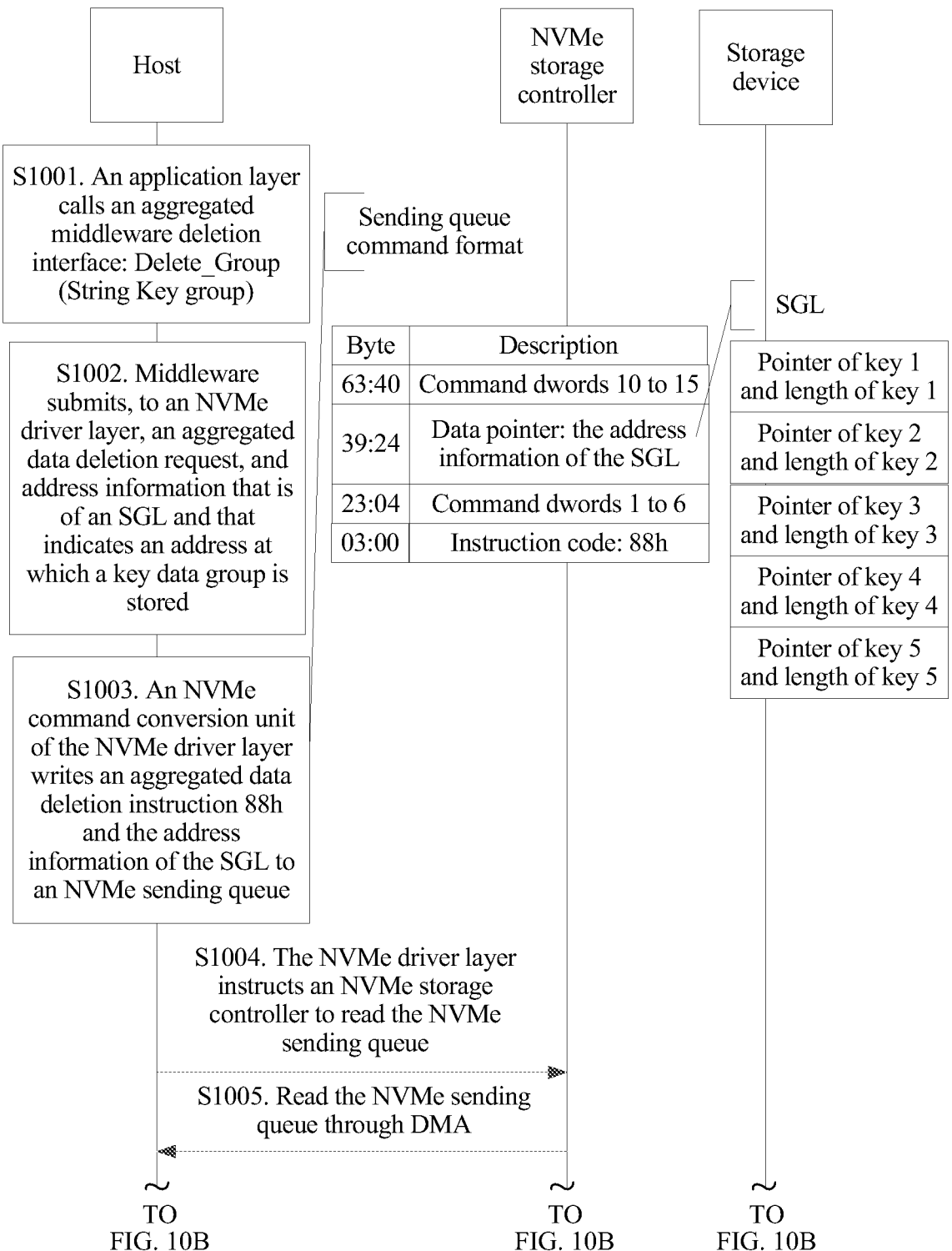
FIG. 10A and FIG. 10B are a schematic flowchart of key-value storage in a case of an aggregated data deletion request according to an embodiment of this application.
Figure 10B:
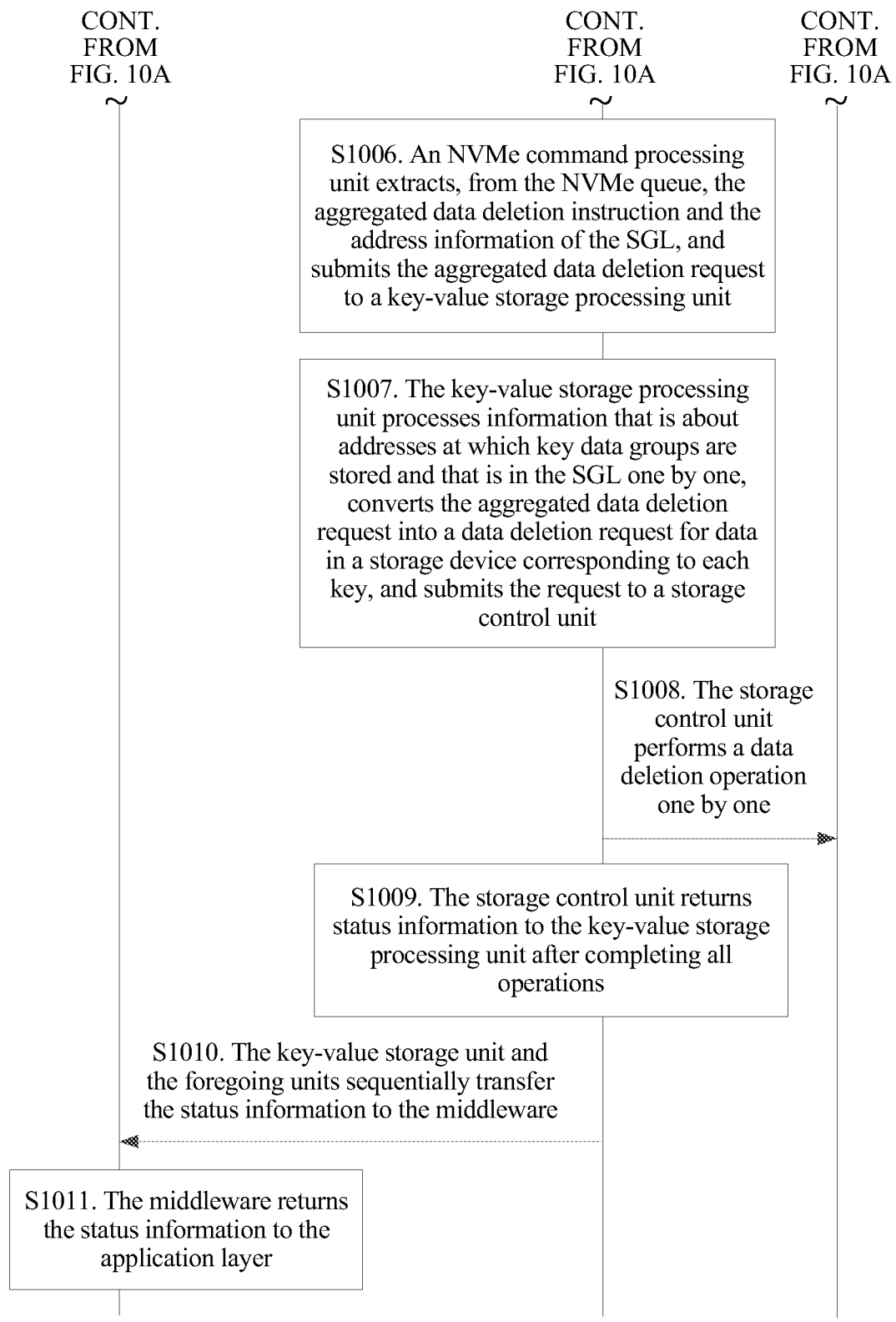

The following describes the key-value storage method provided in the embodiments of this application by using an example in which the key-value storage request is an aggregated data deletion request. As shown in FIG. 10A and FIG. 10B, the key-value storage method provided in this embodiment of this application includes operations S1001 to S1011.

S1001. An application layer calls an aggregated middleware deletion interface Delete_Group (String Key group).

S1002. Middleware submits, to an NVMe driver layer, an aggregated data deletion request, and address information that is of a scatter gather list (SGL) and that indicates an address at which a key data group is stored.

S1003. An NVMe command conversion unit of the NVMe driver layer writes an aggregated data deletion instruction 88$h$ and the address information of the SGL to an NVMe sending queue.

In an NVMe protocol, bytes 0 to 63 are defined as a field corresponding to the NVMe sending queue. In this operation, a command format of the NVMe sending queue is a sending queue command format shown in FIG. 10A and FIG. 10B. Bytes 03:00 (byte 0 to byte 3) are bytes corresponding to an instruction code. Bytes 23:04 (byte 4 to byte 23) are command dwords 1 to 6 (dword 1 to dword 6 of a command word). Bytes 39:24 (byte 24 to byte 39) are bytes corresponding to the address information of the SGL. Bytes 63: 40 (byte 40 to byte 63) are command dwords 10 to 15 (dword 10 to dword 15 of a command word).

It should be noted that an aggregated operation may include any quantity of single operations. FIG. 10A and FIG. 10B merely show, by using an example in which the aggregated data deletion request includes five single data deletion requests, that the SGL includes address information of key 1 to key 5, and does not constitute any limitation on the technical solutions of this application.

It should be noted that, the NVMe sending queue in this embodiment of this application is a specific form of the foregoing instruction sequence. Certainly, as described above, the form of the instruction sequence in this embodiment of this application may be another form such as a data packet. This is not limited in this embodiment of this application.

S1004. The NVMe driver layer instructs an NVMe storage controller to read the NVMe sending queue.

S1005. An NVMe command processing unit of the NVMe storage controller reads the NVMe sending queue through DMA.

S1006. The NVMe command processing unit extracts, from the NVMe queue, the aggregated data deletion instruction and the address information of the SGL, and submits the aggregated data deletion request to a key-value storage processing unit.

S1007. The key-value storage processing unit processes information that is about addresses at which key data groups are stored and that is in the SGL one by one, converts the aggregated data deletion request into a data deletion request for data in a storage device corresponding to each key, and submits the request to a storage control unit.

S1008. The storage control unit performs a data deletion operation one by one.

S1009. The storage control unit returns status information to the key-value storage processing unit after completing all operations.

The status information herein is information about whether all data is successfully deleted.

S1010. The key-value storage processing unit and the foregoing units sequentially transfer the status information to the middleware.

As shown in FIG. 5, the foregoing units herein include the NVMe command processing unit of the NVMe storage controller and the NVMe command conversion unit of the NVMe driver layer of a host.

S1011. The middleware returns the status information to the application layer.

In this way, when the key-value storage request is an aggregated data deletion request, the key-value storage process ends.

The foregoing embodiments shown in FIG. 6A to FIG. 10B are all operations when a host detects a key-value storage request. Certainly, as described above, in this embodiment of this application, the host may further implement non-key-value storage through interaction between a storage protocol and a storage controller. For example, conventional block device storage is also supported. For details, refer to example 6.

Example 6

Figure 11A:
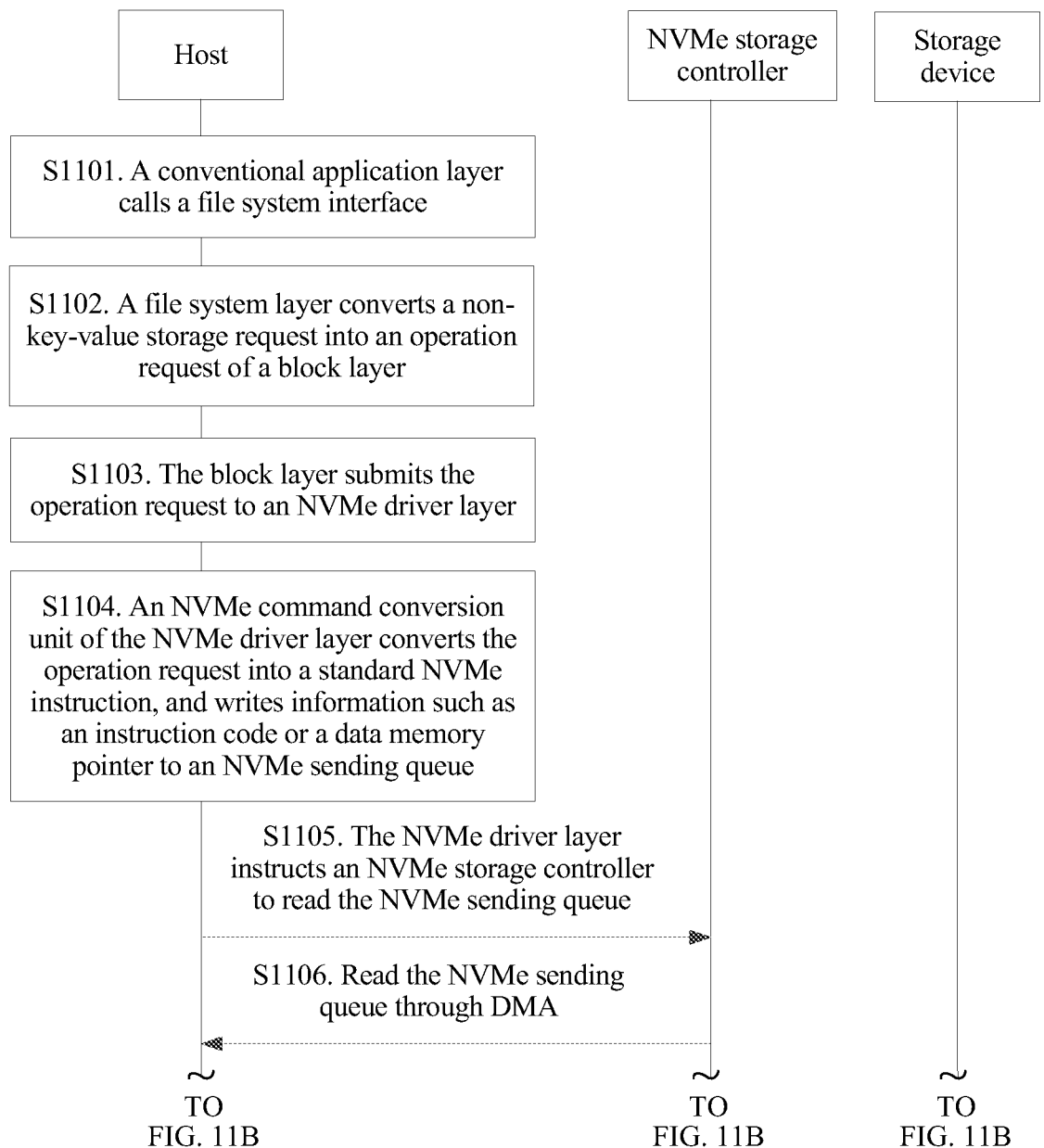
FIG. 11A and FIG. 11B are a schematic operation flowchart of a standard NVMe device related to non-key-value storage according to an embodiment of this application.
Figure 11B:
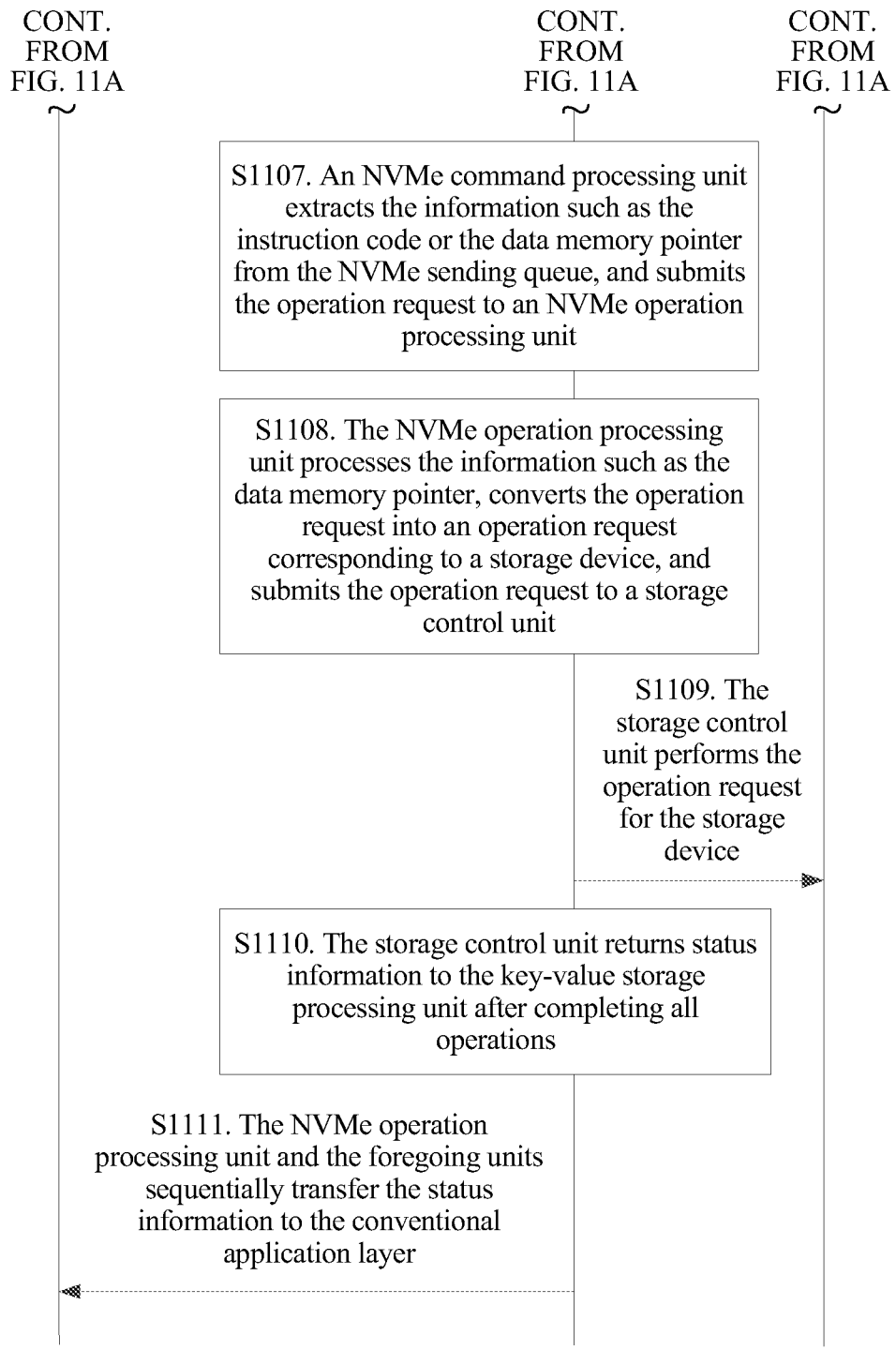

After a host detects a non-key-value storage request, as shown in FIG. 11A and FIG. 11B, a standard NVMe device operation related to non-key-value storage includes operations S1101 to S1111.

S1101. A conventional application layer calls a file system interface.

S1102. A file system layer converts the non-key-value storage request into an operation request of a block layer.

S1103. The block layer submits the operation request to an NVMe driver layer.

S1104. An NVMe command conversion unit of the NVMe driver layer converts the operation request into a standard NVMe instruction, and writes information such as an instruction code or a data memory pointer to an NVMe sending queue.

A command formation of the NVMe sending queue in this embodiment is similar to the NVMe sending queue command format in the foregoing embodiments. Details are not described herein again.

S1105. The NVMe driver layer instructs an NVMe storage controller to read the NVMe sending queue.

S1106. An NVMe command processing unit of the NVMe storage controller reads the NVMe sending queue through DMA.

S1107. The NVMe command processing unit extracts the information such as the instruction code or the data memory pointer from the NVMe sending queue, and submits the operation request to an NVMe operation processing unit.

S1108. The NVMe operation processing unit processes the information such as the data memory pointer, converts the operation request into an operation request corresponding to a storage device, and submits the operation request to a storage control unit.

S1109. The storage control unit performs the operation request for the storage device based on the data memory pointer.

S1110. The storage control unit returns status information to the NVMe operation processing unit.

The status information herein is information about whether the operation request is successfully performed.

S1111. The NVMe operation processing unit and the foregoing units sequentially transfer the status information to the conventional application layer.

As shown in FIG. 5, the foregoing units herein include the NVMe command processing unit of the NVMe storage controller, the NVMe command conversion unit of the NVMe driver layer of the host, the block layer, and the file system.

In this way, the standard NVMe device operation related to the non-key-value storage ends.

The embodiments shown in FIG. 6A to FIG. 11B are all described with reference to the schematic operation flowchart showing that key-value storage is combined with an NVMe protocol to implement key-value storage shown in FIG. 5. If key-value storage is combined with such type of efficient storage protocol as the NVMe protocol, a storage system may have advantages of both. However, as described above, the protocol in the embodiments of this application may be an NVMe protocol, or may be another storage protocol such as a SCSI protocol. This is not limited in this embodiment of this application.

Figure 12:
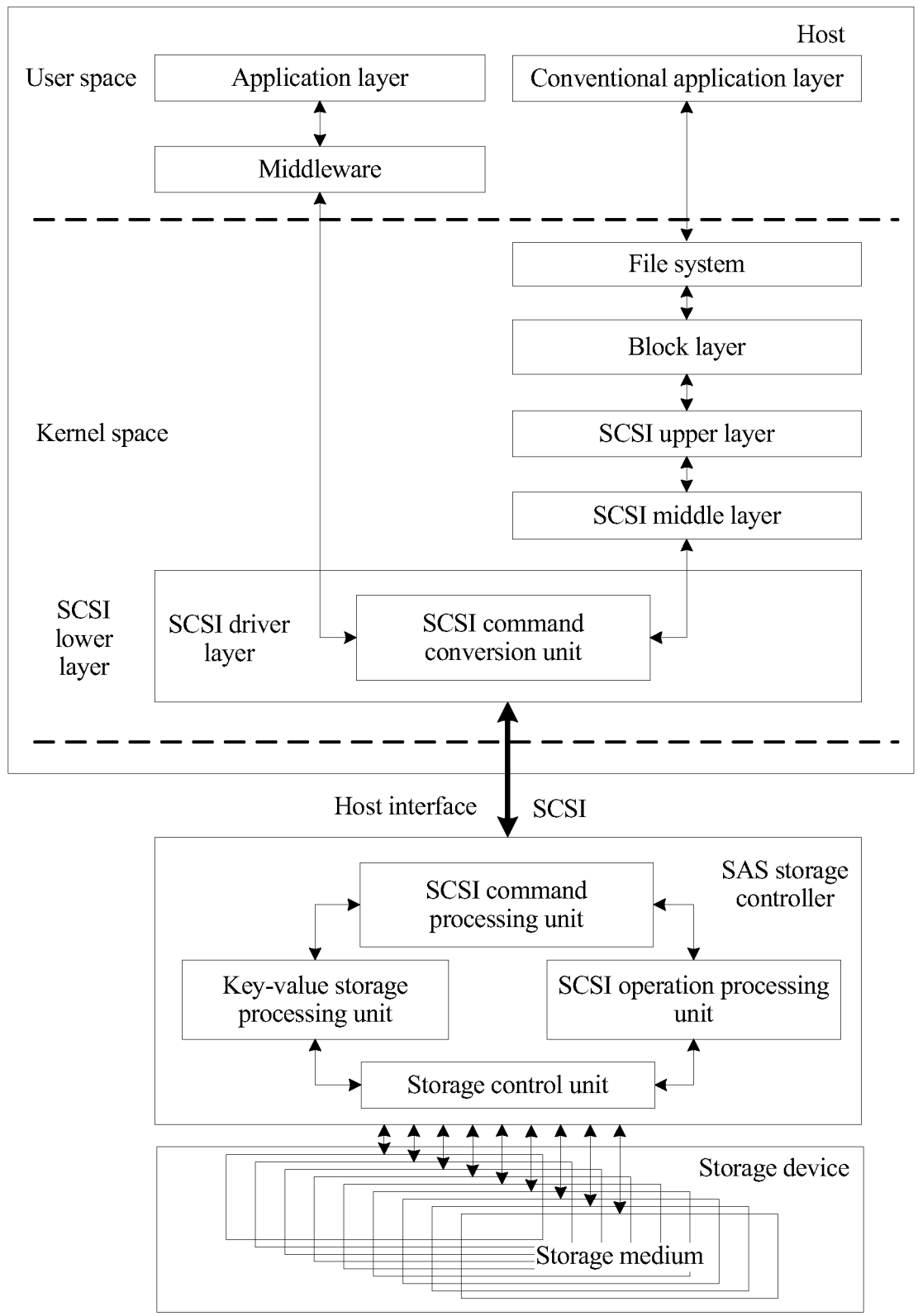
FIG. 12 is a schematic operation flowchart showing that key-value storage is combined with a SCSI protocol to implement key-value storage according to an embodiment of this application.

For example, in the embodiments of this application, the key-value storage may be further combined with the SCSI protocol. FIG. 12 is a schematic operation flowchart showing that key-value storage is combined with a SCSI protocol to implement key-value storage.

First, related units in FIG. 12 are briefly described:

1. Host interface:

The host interface shown in FIG. 12 and the host interface shown in FIG. 5 have a same function. For details, refer to the description of the host interface shown in FIG. 5. Details are not described herein again.

2. Host software module:

(1) An application, a conventional application, middleware, a file system, and a block layer shown in FIG. 12 and the application, the conventional application, the middleware, the file system, and the block layer shown in FIG. 5 respectively have same functions. For details, refer to the descriptions of the application, the conventional application, the middleware, the file system, and the block layer shown in FIG. 5. Details are not described herein again.

(2) A SCSI layer: a software layer for processing a SCSI transaction, including a SCSI upper layer, a SCSI middle layer, and a SCSI lower layer.

(3) A SCSI driver layer: located at a SCSI lower layer, responsible for submitting a SCSI request to a serial attached SCSI interface (SAS) storage controller, and completing control and data exchange operations with the SAS storage controller.

(4) A SCSI command conversion unit: located at a SCSI driver layer, and configured to fill an NVMe sending queue with information such as an extension instruction of the key-value (Key-Value) storage and an address of a key and/or a value, and submit the NVMe sending queue to the SCSI driver layer, so that the SCSI driver layer delivers the NVMe sending queue to a SAS storage controller.

3. SAS storage controller:

(1) A key-value storage processing unit and a storage control unit shown in FIG. 12 and the key-value storage processing unit and the storage control unit shown in FIG. 5 respectively have same functions. For details, refer to the descriptions of the key-value storage processing unit and the storage control unit shown in FIG. 5. Details are not described herein again.

(2) A SCSI command processing unit: analyzing an instruction code in a SCSI sending queue received by a SCSI controller, and distributing the SCSI sending queue to a key-value storage processing unit or a SCSI operation processing unit according to different instructions.

(3) A SCSI operation processing unit: processing a standard SCSI protocol operation request.

4. Storage device:

The storage device interface shown in FIG. 12 and the storage device interface shown in FIG. 5 have a same function. For details, refer to the description of the storage device interface shown in FIG. 5. Details are not described herein again.

Further, an instruction code defined for a block device operation in the SCSI protocol, as shown in Table 5:

TABLE 5

| Command (Command) | Operation code (Operation code) | Type (Type) | Number of a subclause (Subclause) |
|---|---|---|---|
| CHANGE DEFINITION | 40h | O | ANSI NCITS 301 SPC |
| COMPARE | 39h | O | ANSI NCITS 301 SPC |
| COPY | 18h | O | ANSI NCITS 301 SPC |
| COPY AND VERIFY | 3Ah | O | ANSI NCITS 301 SPC |
| FORMAT UNIT | 04h | M | 6.1.1 |
| INQUIRY | 12h | M | ANSI NCITS 301 SPC |
| LOCK-UNLOCK CACHE | 36h | O | 6.1.2 |
| LOG SELECT | 4Ch | O | ANSI NCITS 301 SPC |
| LOG SENSE | 4Dh | O | ANSI NCITS 301 SPC |
| MODE SELECT(6) | 15h | O | ANSI NCITS 301 SPC |
| MODE SELECT(10) | 55h | O | ANSI NCITS 301 SPC |
| MODE SENSE(6) | 1Ah | O | ANSI NCITS 301 SPC |
| MODE SENSE(10) | 5Ah | O | ANSI NCITS 301 SPC |
| MOVE MEDIUM | A7h | O | SMC |
| Obsolete | 01h | OB | 3.3.4 |
| Obsolete | 31h | OB | 3.3.4 |
| Obsolete | 30h | OB | 3.3.4 |
| Obsolete | 32h | OB | 3.3.4 |
| Obsolete | 0Bh | OB | 3.3.4 |
| PERSISTENT RESERVE IN | 5Eh | O1 | ANSI NCITS 301 SPC |
| PERSISTENT RESERVE OUT | 5Fh | O1 | ANSI NCITS 301 SPC |
| PRE-FETCH | 34h | O | 6.1.3 |
| PREVENT-ALLOW MEDIUM REMOVAL | 1Eh | O | ANSI NCITS 301 SPC |
| READ(6) | 08h | M | 6.1.4 |
| READ(10) | 28h | M | 6.1.5 |
| READ(12) | A8h | O | 6.2.4 |
| READ BUFFER | 3Ch | O | ANSI NCITS 301 SPC |
| READ CAPACITY | 25h | M | 6.1.6 |
| READ DEFECT DATA(10) | 37h | O | 6.1.7 |
| READ DEFECT DATA(12) | B7h | O | 6.2.5 |
| READ ELEMENT STATUS | B4h | O | SMC |
| READ LONG | 3Eh | O | 6.1.8 |
| REASSIGN BLOCKS | 07h | O | 6.1.9 |
| REBUILD | 81h | O | 6.1.10 |
| RECEIVE DIAGNOSTIC RESULTS | 1Ch | O | ANSI NCITS 301 SPC |
| REGENERATE | 82h | O | 6.1.11 |
| RELEASE(6) | 17h | O2 | ANSI NCITS 301 SPC |
| RELEASE(10) | 57h | M | ANSI NCITS 301 SPC |
| REPORT LUNS | A0h | O | ANSI NCITS 301 SPC |
| REQUEST SENSE | 03h | M | ANSI NCITS 301 SPC |
| RESERVE(6) | 16h | O2 | ANSI NCITS 301 SPC |
| RESERVE(10) | 56h | M | ANSI NCITS 301 SPC |
| SEEK(10) | 2Bh | O | 6.1.12 |
| SEND DIAGNOSTIC | 1Dh | M | ANSI NCITS 301 SPC |
| SET LIMITS(10) | 33h | O | 6.1.13 |
| SET LIMITS(12) | B3h | O | 6.2.8 |
| START STOP UNIT | 1Bh | O | 6.1.14 |
| SYNCHRONIZE CACHE | 35h | O | 6.1.15 |
| TEST UNIT READY | 00h | M | ANSI NCITS 301 SPC |
| VERIFY | 2Fh | O | 6.1.16 |
| WRITE(6) | 0Ah | O | 6.1.17 |
| WRITE(10) | 2Ah | O | 6.1.18 |

TABLE 5-continued

| Command (Command) | Operation code (Operation code) | Type (Type) | Number of a subclause (Subclause) |
|---|---|---|---|
| WRITE(12) | AAh | O | 6.2.13 |
| WRITE AND VERIFY | 2Eh | O | 6.1.19 |
| WRITE BUFFER | 3Bh | O | ANSI NCITS 301 SPC |
| WRITE LONG | 3Fh | O | 6.1.20 |
| WRITE SAME | 41h | O | 6.1.21 |
| XDREAD | 52h | O | 6.1.22 |
| XDWRITE | 50h | O | 6.1.23 |
| XDWRITE EXTENGED | 80h | O | 6.1.24 |
| XPWRITE | 51h | O | 6.1.25 |

Key:
M = Command implementation is mandatory.
O = Command implementation is optional.
OB = This command is obsolete.
SPC = SCSI-3 instruction set (SCSI-3 Primary Command Set).
Note:
(1) Optional PERSISTENT RESERVE Commands if implemented shall be implemented as a group
(2) Optional RELEASE(6) and RESERVE(6) Commands if implemented shall both be implemented as a group.
(3) The following operation codes are vendor-specific: 02h, 06h, 09h, 0Ch, 0Dh, 0Eh, 0Fh, 10h, 13h, 14h, 19h, 20h, 21h, 22h, 23h, 24h, 26h, 27h, 29h, 2Ch, 2Dh and C0h through FFh.
All remaining operation codes for direct-access block devices are reserved for future standardization.

In this embodiment of this application, the first instruction code carried in the key-value storage request is defined based on the reserved extension field of the SCSI protocol, as shown in Table 6.

TABLE 6

| Command name | Instruction code |
|---|---|
| Write data: Write | 02h |
| Obtain a length of a value corresponding to a key: GetLength | 05h |
| Obtain data: Read | 06h |
| Delete data: Delete | 09h |
| Discard data: TRIM | 0Ch |
| Write data in an aggregated manner: Write | 0Dh |
| Obtain a length of a value corresponding to a key in an aggregated manner: GetLength | 0Eh |
| Obtain data in an aggregated manner: Read | 0Fh |
| Delete data in an aggregated manner: Delete | 10h |
| Discard data in an aggregated manner: TRIM | 13h |

It should be noted that, Table 6 is merely an example of a manner of defining, based on the reserved extension field of the SCSI protocol, the first instruction code carried in the key-value storage request. Certainly, the manner of defining, based on the reserved extension field of the SCSI protocol, the first instruction code carried in the key-value storage request is not limited to the foregoing manner. For example, the foregoing key-value storage operation may be defined in a reserved extension field mentioned in clause 3 in an explanation part in Table 5. This is not limited in this embodiment of this application.

A procedure of performing a key-value storage operation with reference to FIG. 12 is consistent with a procedure of performing a key-value storage operation with reference to FIG. 5. For details, refer to the embodiments shown in FIG. 6A to FIG. 11B. Details are not described herein again.

It can be learned from the key-value storage method shown in the foregoing embodiments that, in the key-value storage method provided in the embodiments of this application, a key-value storage operation is extended to the storage protocol. Therefore, the host can implement the key-value storage through interaction between the storage protocol and the storage controller, without a need to perform conversion on the block layer or the file system to implement the key-value storage, thereby reducing an I/O path delay of a storage system. In addition, the host can implement non-key-value storage through the interaction between the storage protocol and the storage controller. Therefore, conventional block device storage can also be supported.

The solutions provided in the embodiments of this application are mainly described above from a perspective of interaction between the devices. It may be understood that, to implement the foregoing functions, the devices such as the host and the storage controller include corresponding hardware structures and/or software modules for performing the functions. A person skilled in the art should be easily aware that units and algorithm operations in the examples described with reference to the embodiments disclosed in this specification may be implemented in a form of hardware or in a form of a combination of hardware and computer software in this application. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of this application.

In this embodiment of this application, functional modules of the host, the storage controller, and the like may be divided based on the foregoing method example. For example, each function module may be divided according to each function, or two or more functions may be integrated into one processing module. The integrated module may be implemented in a form of hardware, or may be implemented in a form of a functional module of software. It should be noted that the module division in the embodiments of this application is an example, and is merely logical function division. There may be another division manner in an actual implementation.

Figure 13:
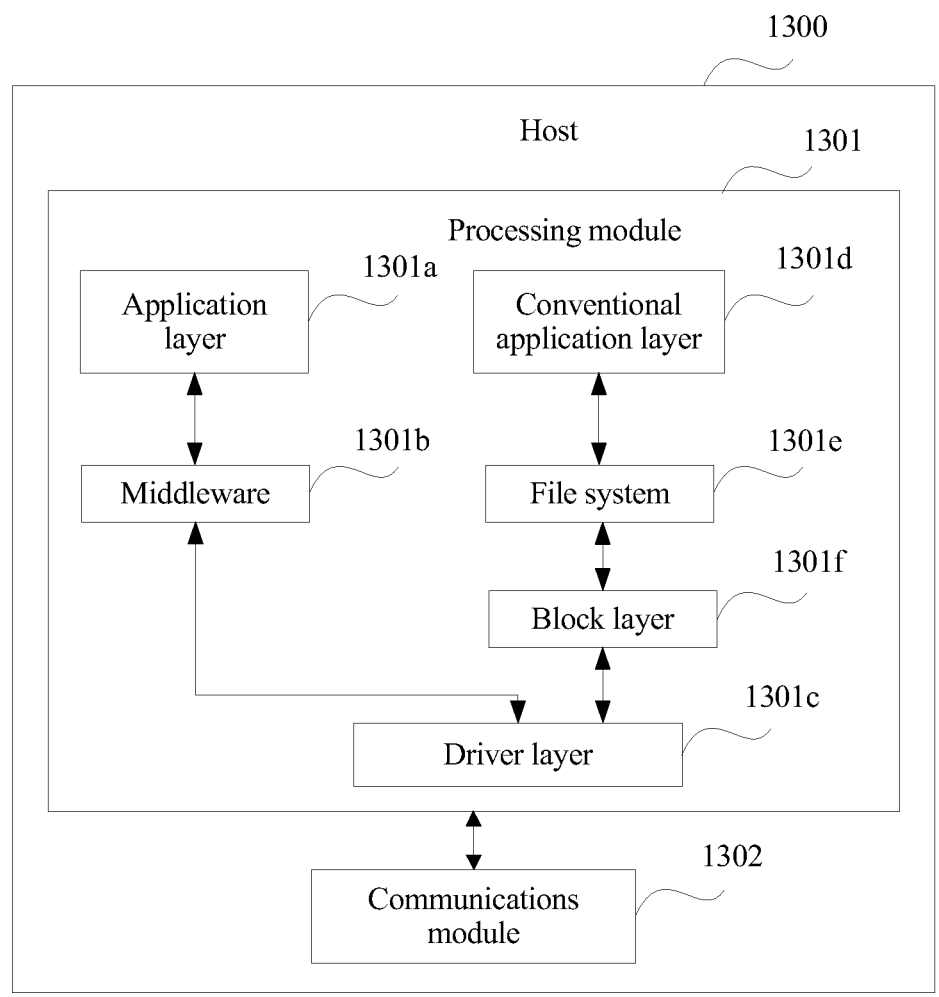
FIG. 13 is a schematic structural diagram of a host according to an embodiment of this application.

When units are integrated, FIG. 13 is a possible schematic structural diagram of a host 1300 in the foregoing embodiments. The host 1300 includes a processing module 1301 and a communications module 1302. The communications module 1302 is configured to communicate with a storage controller. The processing module 1301 is configured to support the host in performing S401 and S407 of the process in FIG. 4A and FIG. 4B. Alternatively, the processing module 1301 may include an application layer 1301a, middleware 1301b, and a driver layer 1301c, and is configured to support the host in performing the operations performed by the application layer, the middleware, and the NVMe driver layer in FIG. 6A to FIG. 10B. Alternatively, the processing module 1301 may include a conventional application layer 1301d, a file system 1301e, a block layer 1301f, and a driver layer 1301c, and is configured to support the host in performing the operations performed by the conventional application layer, the file system, the block layer, and the NVMe driver layer in FIG. 11A and FIG. 11B. For the functional descriptions of the corresponding functional modules, refer to any content related to the operations in the foregoing method embodiments. Details are not described herein again. In addition, the host 1300 may further include a storage module, configured to store program code and data of the host 1300.

The processing module 1301 may be a processor or a controller, for example, may be the CPU 202 in FIG. 2, a general purpose processor, a digital signal processor (DSP), an application-specific integrated circuit (ASIC), a field programmable gate array (FPGA) or another programmable logic device, a transistor logic device, a hardware component, or any combination thereof. It may implement or execute various examples of logical blocks, modules, and circuits that are described with reference to the content disclosed in this application. The processor may be a combination of computing functions, for example, a combination of one or more microprocessors or a combination of a DSP and a microprocessor. The communications module 1302 may be a communications interface, for example, may be the communications interface 205 of the host in FIG. 2, or may be a receiver and a transmitter, or a transceiver circuit. The storage module 1201 may be a memory or a storage.

When the processing module 1301 is a CPU and the communications module 1302 is a communications interface, the host in this embodiment of this application may be the host shown in FIG. 2. For details, refer to related descriptions of FIG. 2. Details are not described herein again.

Figure 14:
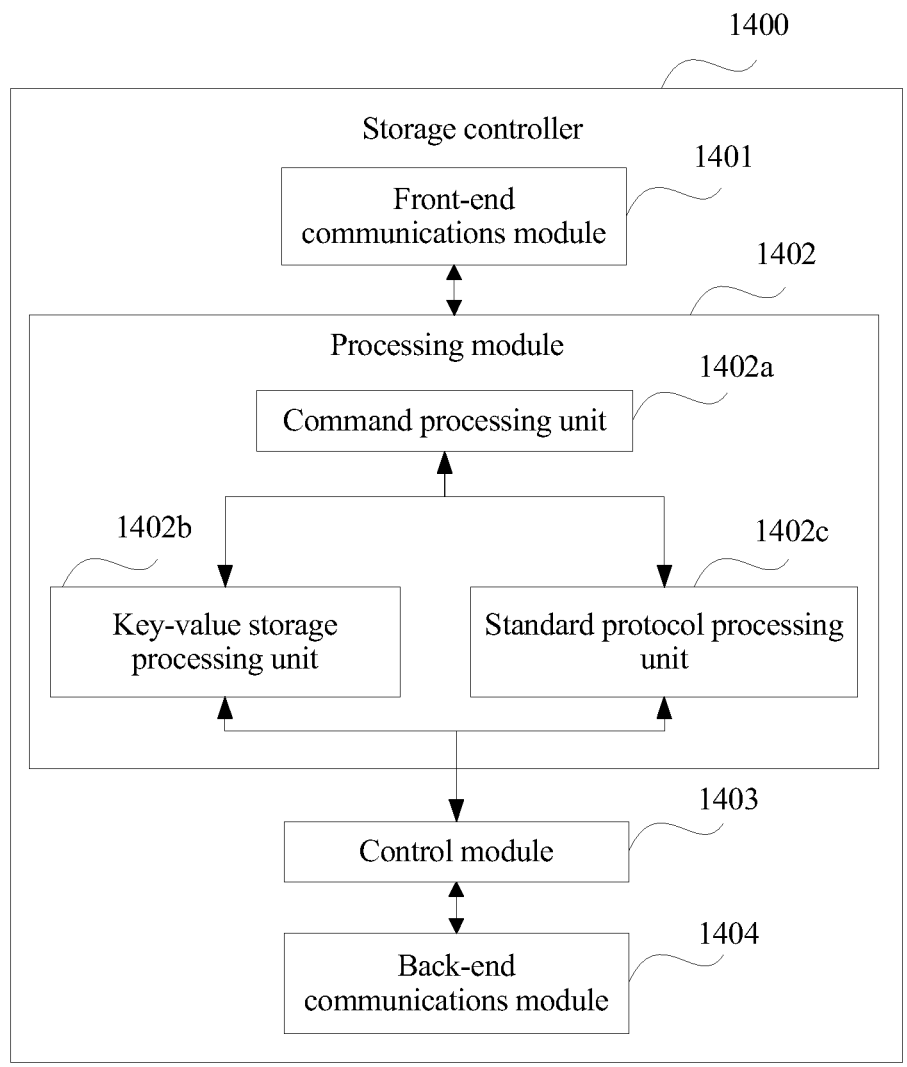
FIG. 14 is a schematic structural diagram of a storage controller according to an embodiment of this application.

When units are integrated, FIG. 14 is a possible schematic structural diagram of a storage controller 1400 in the foregoing embodiments. The storage controller 1400 includes a front-end communications module 1401, a processing module 1402, a control module 1403, and a back-end communications module 1404. The front-end communications module 1401 is configured to support the storage controller 1400 in communicating with a front-end device, for example, communicating with the host in FIG. 4A, FIG. 4B, and FIG. 6A to FIG. 11B. The back-end communications module 1404 is configured to support the storage controller 1400 in communicating with a back-end device, for example, communicating with the storage device in FIG. 4A, FIG. 4B, and FIG. 6A to FIG. 11B. The processing module 1402 may include a command processing unit 1402a, a key-value storage processing unit 1402b, and a standard protocol processing unit 1402c, and is configured to support the storage controller 1400 in performing the operations performed by the command processing unit, the key-value storage processing unit, and the standard protocol processing unit in FIG. 4A and FIG. 4B, or is configured to support the storage controller 1400 in performing the operations performed by the NVMe command processing unit, the key-value storage processing unit, and the NVMe operation processing unit in FIG. 6A to FIG. 11B. The control module 1403 is configured to support the storage controller in performing the operations performed by the storage control unit in FIG. 4A, FIG. 4B and FIG. 6A to FIG. 11B. For the functional descriptions of the corresponding functional modules, refer to any content related to the operations in the foregoing method embodiments. Details are not described herein again. In addition, the storage controller 1400 may further include a storage module, configured to store program code and data of the storage controller 1400.

The processing module 1402 and the control module 1403 may be a processor or a controller, for example, may be the CPU 212 in FIG. 2, a general purpose processor, a digital signal processor (DSP), an application-specific integrated circuit (ASIC), a field programmable gate array (FPGA) or another programmable logic device, a transistor logic device, a hardware component, or any combination thereof. It may implement or execute various examples of logical blocks, modules, and circuits that are described with reference to the content disclosed in this application. The processor may be a combination of computing functions, for example, a combination of one or more microprocessors or a combination of a DSP and a microprocessor. The front-end communications module 1401 and the back-end communications module 1404 may be communications interfaces, for example, may be the front-end communications interface 211 and the back-end communications interface 214 in FIG. 2 respectively, or may be a receiver and a transmitter, or transceiver circuits. The storage module may be a memory or a storage.

When the processing module 1402 and the control module 1403 are CPUs, and the front-end communications module 1401 and the back-end communications module 1404 are communications interfaces, the storage controller in this embodiment of this application may be the storage controller shown in FIG. 2. For details, refer to related descriptions of FIG. 2. Details are not described herein again.

The methods or algorithm operations described with reference to the content disclosed in this application may be implemented in a hardware manner, or may be implemented by a processor executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other forms well-known in the art. A storage medium used as an example is coupled to the processor, so that the processor can read information from the storage medium, and can write information into the storage medium. Certainly, the storage medium may be a part of the processor. The processor and the storage medium may be located in an ASIC. In addition, the ASIC may be located in a core network interface device. Certainly, the processor and the storage medium may exist in the core network interface device as discrete components.

A person of skill in the art should be aware that in one or more of the foregoing examples, the functions described in this application may be implemented by using hardware, software, firmware, or any combination thereof. When this application is implemented by software, these functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general or dedicated computer.

In the foregoing specific implementations, the objective, technical solutions, and benefits of this application are further described in detail. It should be understood that the foregoing descriptions are merely specific implementations of this application, but are not intended to limit the protection scope of this application. Any modification, equivalent replacement, or improvement made based on the technical solutions of this application shall fall within the protection scope of this application.

What is claimed is:

1. A key-value storage method, wherein the method comprises:
   obtaining, by a storage controller, a first storage request instruction sequence, wherein the first storage request instruction sequence is constituted by writing, by a host, a first instruction code and address information that are carried in a key-value storage request to a field defined in a protocol, wherein the first instruction code is an instruction code defined based on a reserved extension field in the protocol;
   extracting, by the storage controller, the first instruction code and the address information from the first storage request instruction sequence; and
   performing, by the storage controller, an operation corresponding to the first instruction code on a storage device based on the first instruction code and the address information.

2. The method according to claim 1, wherein the obtaining, by the storage controller, the first storage request instruction sequence comprises:
   reading, by the storage controller, the first storage request instruction sequence from memory allocated by the host to the first storage request instruction sequence based on the field defined in the protocol.

3. The method according to claim 1, wherein the key-value storage request comprises a data write request, a data obtaining request, a data deletion request, or a data discarding request, wherein
   the address information carried in the data write request comprises information about addresses at which a key and a value are stored;
   the address information carried in the data obtaining request comprises information about an address at which a key is stored;
   the address information carried in the data deletion request comprises information about an address at which a key is stored; or
   the address information carried in the data discarding request comprises information about an address at which a key is stored.

4. The method according to claim 3, wherein in response to the key-value storage request being a data obtaining request, before the obtaining, by the storage controller, the first storage request instruction sequence, the method further comprises:
   obtaining, by the storage controller, a length that is of a value and that is requested by the data obtaining request; and
   sending, by the storage controller, the length of the value to the host, so that the host allocates memory to the value based on the length of the value; and
   the performing, by the storage controller, the operation corresponding to the first instruction code on the storage device based on the first instruction code and the address information comprises:
   reading, by the storage controller based on the first instruction code and the address information, data to the memory allocated by the host to the value.

5. The method according to claim 4, wherein the obtaining, by the storage controller, the length that is of the value and that is requested by the data obtaining request comprises:
   obtaining, by the storage controller, a second storage request instruction sequence, wherein the second storage request instruction sequence is constituted by writing, by the host to the field defined in the protocol, an instruction code of obtaining a length of a value corresponding to a key, and information about an address at which the key is stored, wherein the instruction code of obtaining the length of the value corresponding to the key is an instruction code defined based on the reserved extension field in the protocol;
   extracting, by the storage controller from the second storage request instruction sequence, the instruction code of obtaining the length of the value corresponding to the key, and the information about the address at which the key is stored; and obtaining, by the storage controller, the length of the value from the storage device based on the instruction code of obtaining the length of the value corresponding to the key, and the information about the address at which the key is stored.

6. The method according to claim 1, wherein the key-value storage request is an aggregated key-value storage request comprising a plurality of single key-value storage requests, wherein the address information carried in the key-value storage request is indexed by using address information in a scatter gather list, and the scatter gather list comprises address information carried in each of the plurality of single key-value storage requests.

7. The method according to claim 1, wherein the method further comprises:

obtaining, by the storage controller, a third storage request instruction sequence, wherein the third storage request instruction sequence is constituted by writing, by the host, a second instruction code and a data memory pointer that are carried in a non-key-value storage request to the field defined in the protocol, wherein the second instruction code is a standard instruction code of the protocol;

extracting, by the storage controller, the second instruction code and the data memory pointer from the third storage request instruction sequence; and performing, by the storage controller, an operation corresponding to the second instruction code on the storage device based on the second instruction code and the data memory pointer.

8. A host, wherein the host comprises a processing module and a communications module, wherein the processing module is configured to: after a key-value storage request is detected, write a first instruction code and address information that are carried in the key-value storage request to a field defined in a protocol, to constitute a first storage request instruction sequence, wherein the first instruction code is an instruction code defined based on a reserved extension field in the protocol; and the communications module is configured to interact with the storage controller, so that the storage controller obtains the first storage request instruction sequence.

9. The host according to claim 8, wherein the processing module is configured to:

allocate memory to the first storage request instruction sequence based on the field defined in the protocol; and
write the first instruction code and the address information that are carried in the key-value storage request to the memory; and the communications module is configured to:
instruct the storage controller to read the first storage request instruction sequence from the memory.

10. The host according to claim 8, wherein the key-value storage request comprises a data write request, a data obtaining request, a data deletion request, or a data discarding request, wherein the address information carried in the data write request comprises information about addresses at which a key and a value are stored;

the address information carried in the data obtaining request comprises information about an address at which a key is stored;

the address information carried in the data deletion request comprises information about an address at which a key is stored; or the address information carried in the data discarding request comprises information about an address at which a key is stored.

11. The host according to claim 10, wherein if the key-value storage request is a data obtaining request, the processing module is further configured to: after the key-value storage request is detected, and before writing the first instruction code and the address information that are carried in the key-value storage request to the field defined in the protocol, to constitute the first storage request instruction sequence, obtain a length that is of a value and that is requested by the data obtaining request; and allocate memory to the value based on the length of the value, so that after the communications module interacts with the storage controller and the storage controller obtains the first storage request instruction sequence, the storage controller reads data to the memory allocated by the processing module to the value.

12. The host according to claim 11, wherein the processing module is configured to:

write, to the field defined in the protocol, an instruction code of obtaining a length of a value corresponding to a key, and information about an address at which the key is stored, to constitute a second storage request instruction sequence, wherein the instruction code of obtaining the length of the value corresponding to the key is an instruction code defined based on the reserved extension field in the protocol;

interact with the storage controller by using the communications module, so that the storage controller obtains the second storage request instruction sequence; and receive, by using the communications module, the length that is of the value and that is sent by the storage controller.

13. The host according to claim 8, wherein the key-value storage request is an aggregated key-value storage request comprising a plurality of single key-value storage requests, wherein the address information carried in the key-value storage request is indexed by using address information in a scatter gather list, and the scatter gather list comprises address information carried in each of the plurality of single key-value storage requests.

14. The host according to claim 8, wherein:

the processing module is further configured to: after a non-key-value storage request is detected, write a second instruction code and a data memory pointer that are carried in the non-key-value storage request to the field defined in the protocol, to constitute a third storage request instruction sequence, wherein the second instruction code is a standard instruction code of the protocol; and the communications module is further configured to interact with the storage controller, so that the storage controller obtains the third storage request instruction sequence.

15. A storage controller, wherein the storage controller comprises a front-end communications module, a back-end communications module, a processing module, and a control module, wherein the front-end communications module is configured to obtain a first storage request instruction sequence from a host, wherein the first storage request instruction sequence is constituted by writing, by the host, a first instruction code and address information that are carried in a key-value storage request to a field defined in a protocol, wherein the first instruction code is an instruction code defined based on a reserved extension field in the protocol;

the processing module is configured to extract the first instruction code and the address information from the first storage request instruction sequence; and the control module is configured to perform, by using the back-end communications module, an operation corresponding to the first instruction code on a storage device based on the first instruction code and the address information.

16. The storage controller according to claim 15, wherein the front-end communications module is configured to:

read the first storage request instruction sequence from memory allocated by the host to the first storage request instruction sequence based on the field defined in the protocol.

17. The storage controller according to claim 15, wherein the key-value storage request comprises a data write request, a data obtaining request, a data deletion request, or a data discarding request, wherein the address information carried in the data write request comprises addresses at which a key and a value are stored;

the address information carried in the data obtaining request comprises information about an address at which a key is stored;

the address information carried in the data deletion request comprises information about an address at which a key is stored; or the address information carried in the data discarding request comprises information about an address at which a key is stored.

18. The storage controller according to claim 17, wherein if the key-value storage request is a data obtaining request, the processing module is further configured to: before the front-end communications module obtains the first storage request instruction sequence, obtain a length that is of a value and that is requested by the data obtaining request;

the communications module is further configured to send the length of the value to the host, so that the host allocates memory to the value based on the length of the value; and the control module is configured to:

read, based on the first instruction code and the address information, data to the memory allocated by the host to the value.

19. The storage controller according to claim 18, wherein the processing module is configured to:

obtain, by using the front-end communications module, a second storage request instruction sequence, wherein the second storage request instruction sequence is constituted by writing, by the host to the field defined in the protocol, an instruction code of obtaining a length of a value corresponding to a key, and information about an address at which the key is stored, wherein the instruction code of obtaining the length of the value corresponding to the key is an instruction code defined based on the reserved extension field in the protocol;

extract, from the second storage request instruction sequence, the instruction code of obtaining the length of the value corresponding to the key, and the information about the address at which the key is stored; and obtain, by using the control module and the back-end communications module, the length of the value from the storage device based on the instruction code of obtaining the length of the value corresponding to the key, and the information about the address at which the key is stored.

20. The storage controller according to claim 15, wherein the key-value storage request is an aggregated key-value storage request comprising a plurality of single key-value storage requests, wherein the address information carried in the key-value storage request is indexed by using address information in a scatter gather list, and the scatter gather list comprises address information carried in each of the plurality of single key-value storage requests.

21. The storage controller according to claim 15, wherein:

the front-end communications module is further configured to obtain a third storage request instruction sequence from the host, wherein the third storage request instruction sequence is constituted by writing, by the host, a second instruction code and a data memory pointer that are carried in a non-key-value storage request to the field defined in the protocol, wherein the second instruction code is a standard instruction code of the protocol;

the processing module is further configured to extract the second instruction code and the data memory pointer from the third storage request instruction sequence; and the control module is further configured to perform, by using the back-end communications module, an operation corresponding to the second instruction code on the storage device based on the second instruction code and the data memory pointer.

* * * * *